US011531950B2

(12) United States Patent
Sella et al.

(10) Patent No.: US 11,531,950 B2
(45) Date of Patent: Dec. 20, 2022

(54) DYNAMIC ANALYTICS AND FORECASTING FOR MESSAGING STAFF

(71) Applicant: LIVEPERSON, INC., New York, NY (US)

(72) Inventors: Irit Sella, Herzliya (IL); Leor Gruendlinger, Tel Aviv (IL); Matan Mandelbrod, Pardes Hannah (IL); Navot Akiva, Kfar Saba (IL)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/132,395

(22) Filed: Dec. 23, 2020

(65) Prior Publication Data
US 2021/0201244 A1 Jul. 1, 2021

Related U.S. Application Data

(60) Provisional application No. 62/955,308, filed on Dec. 30, 2019.

(51) Int. Cl.
G06Q 10/06 (2012.01)
H04M 3/51 (2006.01)
(Continued)

(52) U.S. Cl.
CPC ....... G06Q 10/06398 (2013.01); G06Q 10/04 (2013.01); G06Q 10/063118 (2013.01);
(Continued)

(58) Field of Classification Search
CPC combination set(s) only.
See application file for complete search history.

(56) References Cited

U.S. PATENT DOCUMENTS 9,178,999 B1 * 11/2015 Hegde ................. H04M 3/5232
10,616,415 B1 * 4/2020 Howard .............. H04M 3/5232
(Continued)

OTHER PUBLICATIONS

C. M. Passmore and J. Zhan, "Determining Appropriate Staffing Adjustments in a Call Center Staff Group," 2013 International Conference on Social Computing, 2013, pp. 1046-1053, doi: 10.1109/SocialCom.2013.169. (Year: 2013).*

Primary Examiner — Crystol Stewart
(74) Attorney, Agent, or Firm — Polsinelli LLP

(57) ABSTRACT

Systems and methods are provided for dynamic generation of staff analytics and forecasts based on skill and service level. Dynamic forecasting allows for forecast generation in real-time and may be based on historical data regarding skills and results, as well as data science to identify patterns and make predictions. The resulting staffing forecast may therefore provide for efficient management of messaging staff costs while preserving the desired service quality. The staffing forecast may include a volume forecast that is tailored to the unique nature of asynchronous messaging, as well as the unique messaging needs of the entity so as to efficiently manage messaging operations and make data-driven staffing decisions that take service level into account. An exemplary embodiment may include dynamic analytics tools that may use specified target and/or resource numbers (e.g., desired service level) for an existing messaging operation and get a detailed per-skill staffing forecast.

24 Claims, 17 Drawing Sheets

(51) Int. Cl.
*G06Q 10/04* (2012.01)
*G06N 20/00* (2019.01)
*H04M 3/42* (2006.01)

(52) U.S. Cl.
CPC .......... *H04M 3/5175* (2013.01); *G06N 20/00* (2019.01); *H04M 3/42221* (2013.01)

(56) References Cited

U.S. PATENT DOCUMENTS

| | | | |
|---|---|---|---|
| 10,812,656 B1* | 10/2020 | Brooks | G06Q 10/0633 |
| 2002/0184069 A1* | 12/2002 | Kosiba | H04M 3/50 |
| | | | 705/7.38 |
| 2008/0063178 A1* | 3/2008 | Paden | H04M 3/5175 |
| | | | 379/265.06 |
| 2012/0020473 A1* | 1/2012 | Mart | H04L 51/14 |
| | | | 379/265.09 |
| 2013/0051548 A1* | 2/2013 | Chavez | G06Q 10/101 |
| | | | 379/265.09 |
| 2014/0143026 A1* | 5/2014 | Nies | G06Q 10/06398 |
| | | | 705/7.42 |
| 2017/0270099 A1* | 9/2017 | Gorny | G06Q 30/01 |
| 2017/0324868 A1* | 11/2017 | Tamblyn | H04M 7/0045 |
| 2018/0082213 A1* | 3/2018 | McCord | G06N 7/005 |
| 2019/0370669 A1* | 12/2019 | Pais | G06F 40/30 |
| 2020/0042928 A1* | 2/2020 | Kim | G06Q 10/063114 |
| 2020/0366719 A1* | 11/2020 | Uzelac | H04L 63/10 |
| 2021/0029246 A1* | 1/2021 | Erhart | H04M 3/5166 |
| 2021/0044697 A1* | 2/2021 | Khafizov | G06F 16/35 |
| 2022/0124200 A1* | 4/2022 | Wang | H04M 3/5175 |

* cited by examiner

DYNAMIC ANALYTICS AND FORECASTING FOR MESSAGING STAFF

CROSS-REFERENCE TO RELATED APPLICATIONS

The present patent application claims the priority benefit of U.S. provisional patent application No. 62/955,308 filed Dec. 30, 2019, the disclosure of which is incorporated by reference herein.

BACKGROUND OF THE INVENTION

1. Field of the Invention

The present invention generally relates to dynamic analytics and forecasting. More specifically, the present invention relates to dynamic analytics and forecasting for messaging staff.

2. Description of the Background Art

Presently available contact center operations occur by manual means and are performed by human staff. Such human staff may be trained in various skills, such as messaging (e.g., how to answer questions), providing services (e.g., processing return requests, changing addresses), and service routing (e.g., how to provide answers and basic services) on behalf of a specific entity, company, or brand. Messaging may occur via any type of messaging application known in the art, including SMS, MMS, instant messaging services, direct messaging services, Facebook Messenger, WhatsApp, and the like. Each entity (e.g., business or other type of organization) may have different types of staffing needs and different types of skills. Thus, different levels and allocations of staff may result in different levels of efficiency, service types and quality thereof, and/or customer satisfaction.

There had previously been little visibility into the details (e.g., handling time) of specific messaging interactions, however, which means that most entities have very little data regarding messaging interactions. By contrast, synchronized communication such as voice or chat may have clear-cut start- and end-times. For voice conversations, the duration between a call's initiation and termination is its handle-time. For chat (where multiple chat conversations may be conducted simultaneously, the duration of the conversation may be divided by the number of concurrent conversations conducted by a messaging agent.

Compared to voice or chat interactions that have clear-cut start and end-times, other types of messaging interactions (e.g., email, text or other messaging applications) may take place intermittently and at varying levels over the course of several hours. As such, the handling time calculations cannot be practically applied to such asynchronous messaging communications, where a single conversation may be conducted over the course of several hours, but may only represent a few minutes of time in the aggregate It may therefore be difficult and complicated to predict what levels and allocations are staffing are needed by a particular entity with any degree of accuracy. Complicating factors may include that concurrency of messaging interactions by staff may not be fixed, difficulty in identifying precisely when messaging staff is available for messaging or not, diffident need levels across different skills, different times required to address a type of need, etc. Many forecasts may therefore be based on high-level generalities and estimates rather than tailored to specific needs in real-time.

There is, therefore, a need in the art for improved systems and methods for improved systems and methods for dynamic forecasting based on messaging language.

Figure 1:
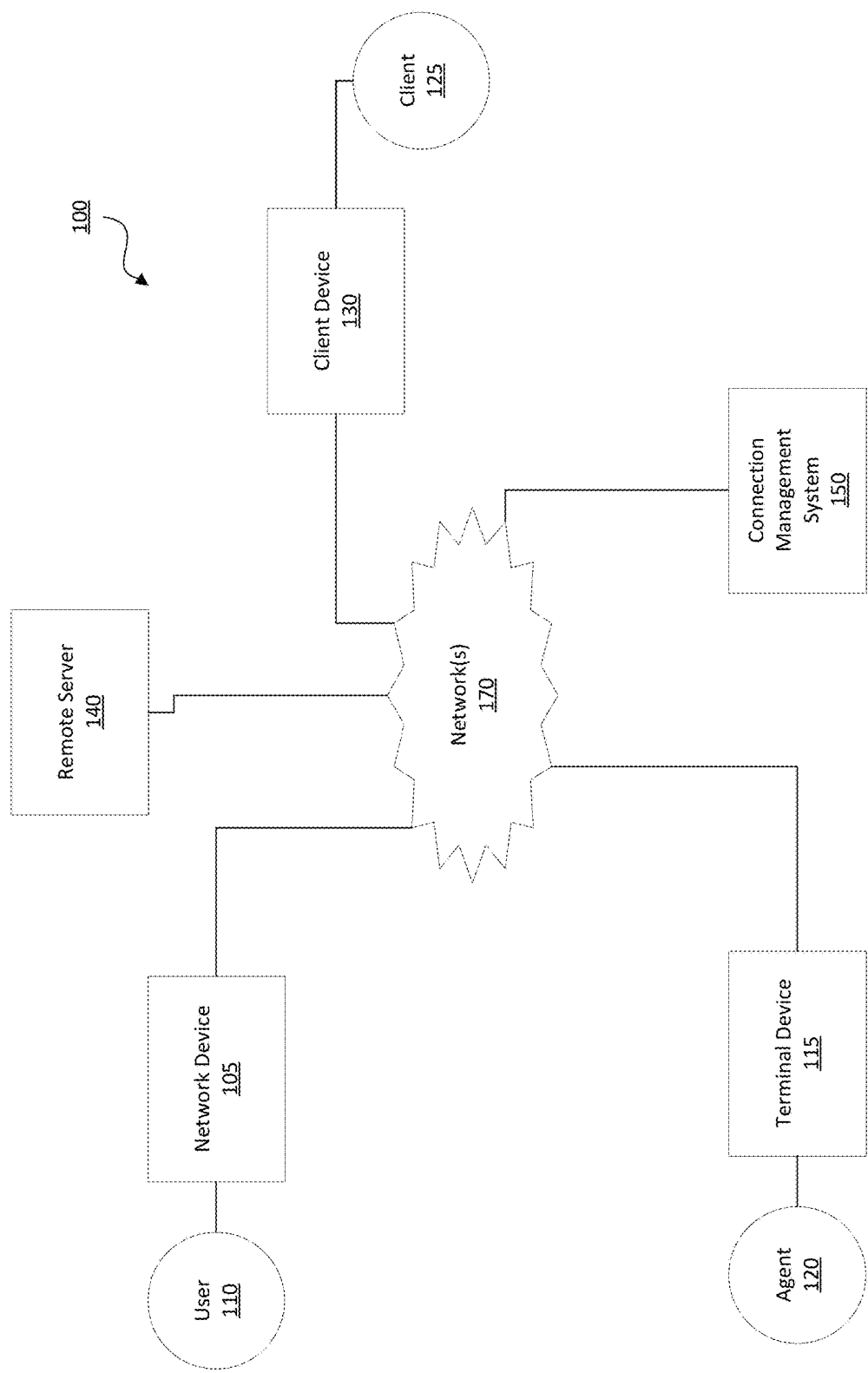
FIG. 1 shows a block diagram of an embodiment of a network interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Embodiments of the present invention allow for real-time analytics and dynamic generation of staff forecasts based on skill and target service level (e.g., as measured by one or more metrics regarding conversational interactions, resolutions, satisfaction levels, etc.). As a resource planning tool, such real-time analytics and dynamic forecasting provides entities with the unique ability to generate forecasts for messaging staff. Such dynamic forecasting may be based on historical data regarding skills and results, as well as data science to identify patterns, trends, and corrections with granularity, as well as to make predictions. The resulting staffing forecast may therefore provide for efficient messaging staffing and management of the staff and associated costs, all while preserving the desired service quality.

As discussed herein, the staffing forecast may include a volume forecast that is tailored to the unique nature of asynchronous messaging, as well as the unique messaging needs of one or more entities so as to efficiently manage messaging operations and make data-driven staffing decisions that take service level into account. An exemplary embodiment may therefore include dynamic analytics tools that may use specified target and/or resource numbers (e.g., desired service level) for an existing messaging operation and get a detailed per-skill staffing forecast.

The entities engaged in real-time analytics and dynamic forecasting may include a variety of businesses and other organizations that deal with customers, clients, or other individuals. Different types of skills may be desirable to different entities, including skills that are associated with business or organization-specific products, services, departments, brands, and other concerns. Likewise, different entities may define target service levels differently. Some entities may be concerned with efficiency and streamlining customer interactions, for example, while other entities may be more concerned with ensuring their users (or specific group thereof) receive premium services. An entity may not only establish targets that are different from another entity, but an entity may establish targets for different skills, different user groups, different departments, different brands, and other parameters.

As such, while data from a number of the entities may be tracked and analyzed in aggregate in some embodiments, learning models may also be developed and tailored to the particular resources and needs of a particular entity. Such learning models may further be refined to be even more customized to the entity as data is gathered regarding the entity's messaging operations, staffing, and success in meeting its defined targets. Over time, therefore, the resulting forecasts generated for the entity may become more accurate and successful in achieving specified targets.

Real-time analytics and dynamic forecast generation are implemented by a variety of computing devices and network systems as described herein. FIG. 1 shows a block diagram of an embodiment of an exemplary network interaction system 100 that implements and supports certain embodiments and features described herein. Certain embodiments relate to establishing a connection channel between a network device 105 (which can be operated by a user 110) and a terminal device 115 (which can be operated by an agent 120 that may be part of the messaging staff). In certain embodiments, the network interaction system 100 can include a client device 130 associated with a client 125.

In certain embodiments, a user 110 can be an individual accessing an online messaging service provided by a remote server 140. A client 125 can be an individual, department, or entity that provides, operates, or is otherwise associated with the online service, or individuals employed by or assigned by such an entity to perform the tasks available to a user 110 as described herein. The agent 120 can be an individual, such as a messaging or other type of messaging support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
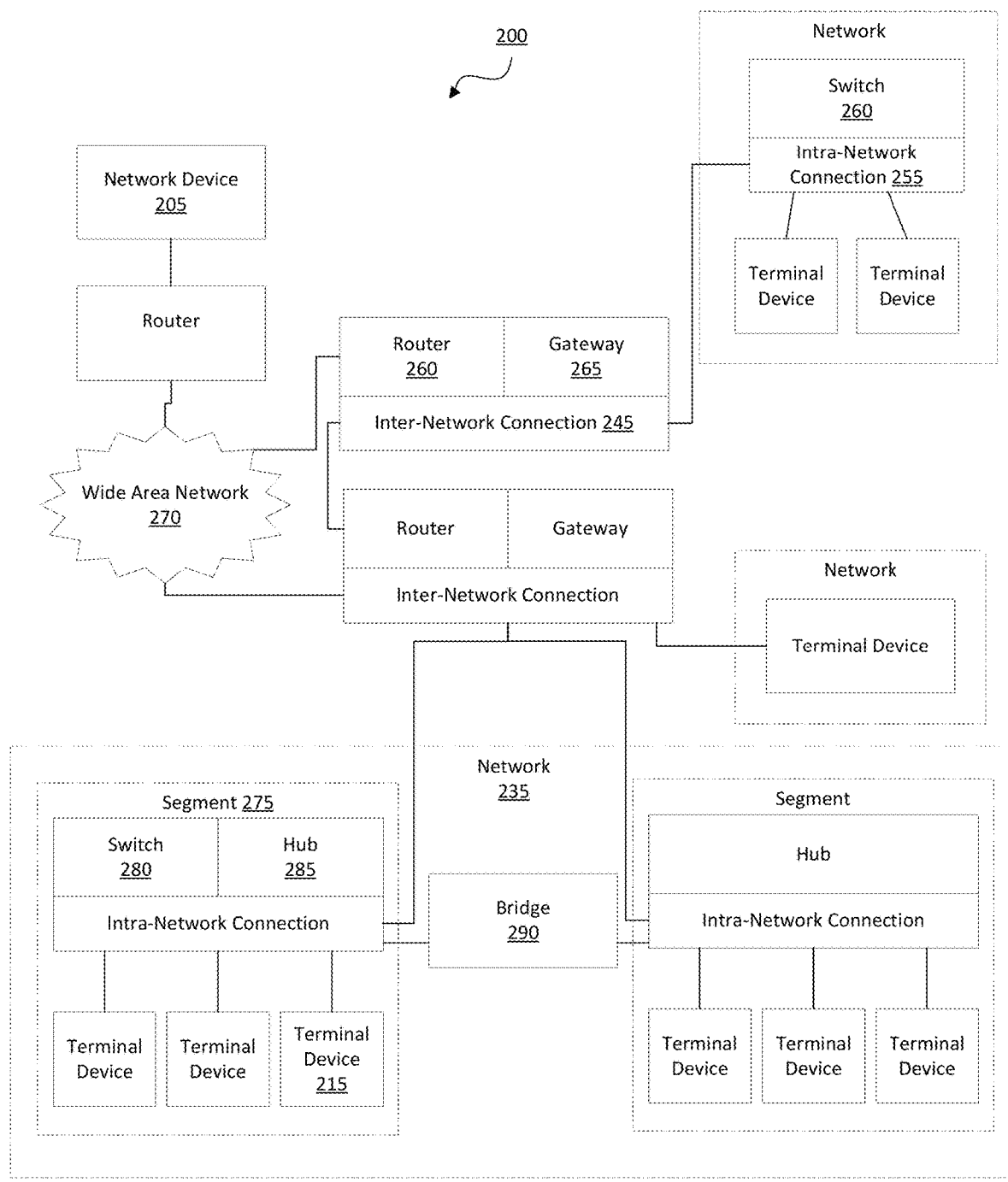
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
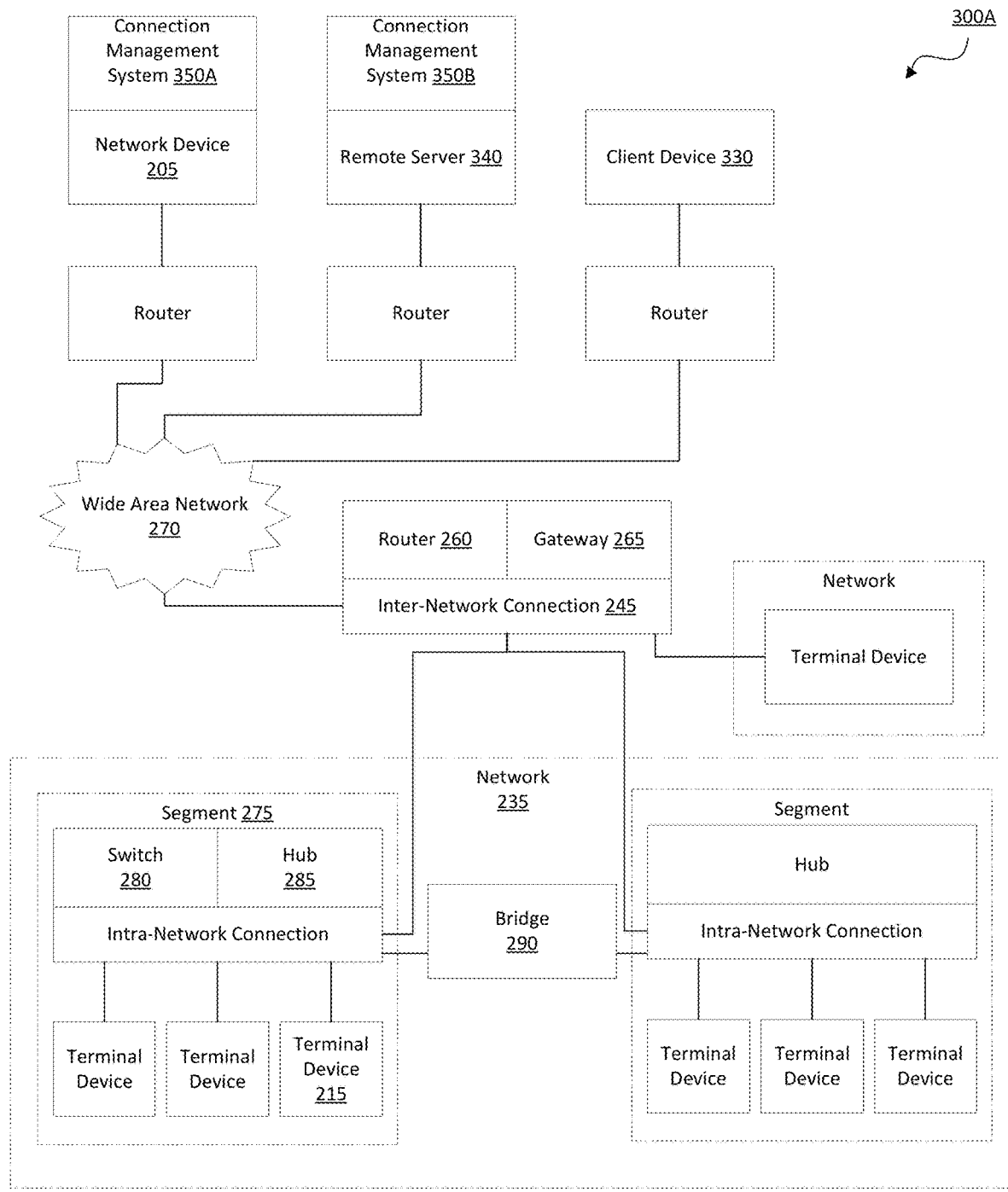
FIGS. 3A-3C show block diagrams of other embodiments of a network interaction system that includes a connection management system.
Figure 3B:
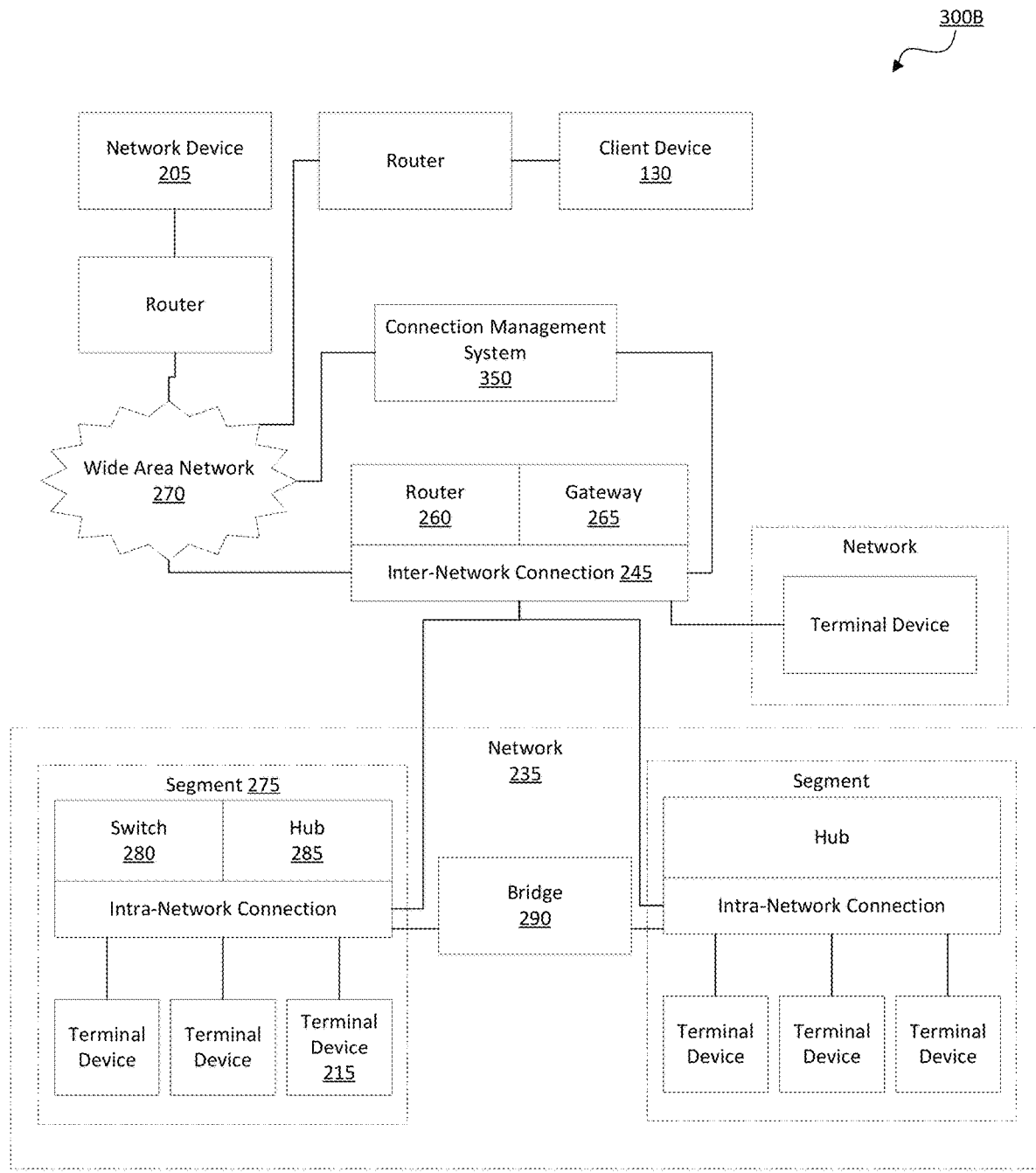
Figure 3C:
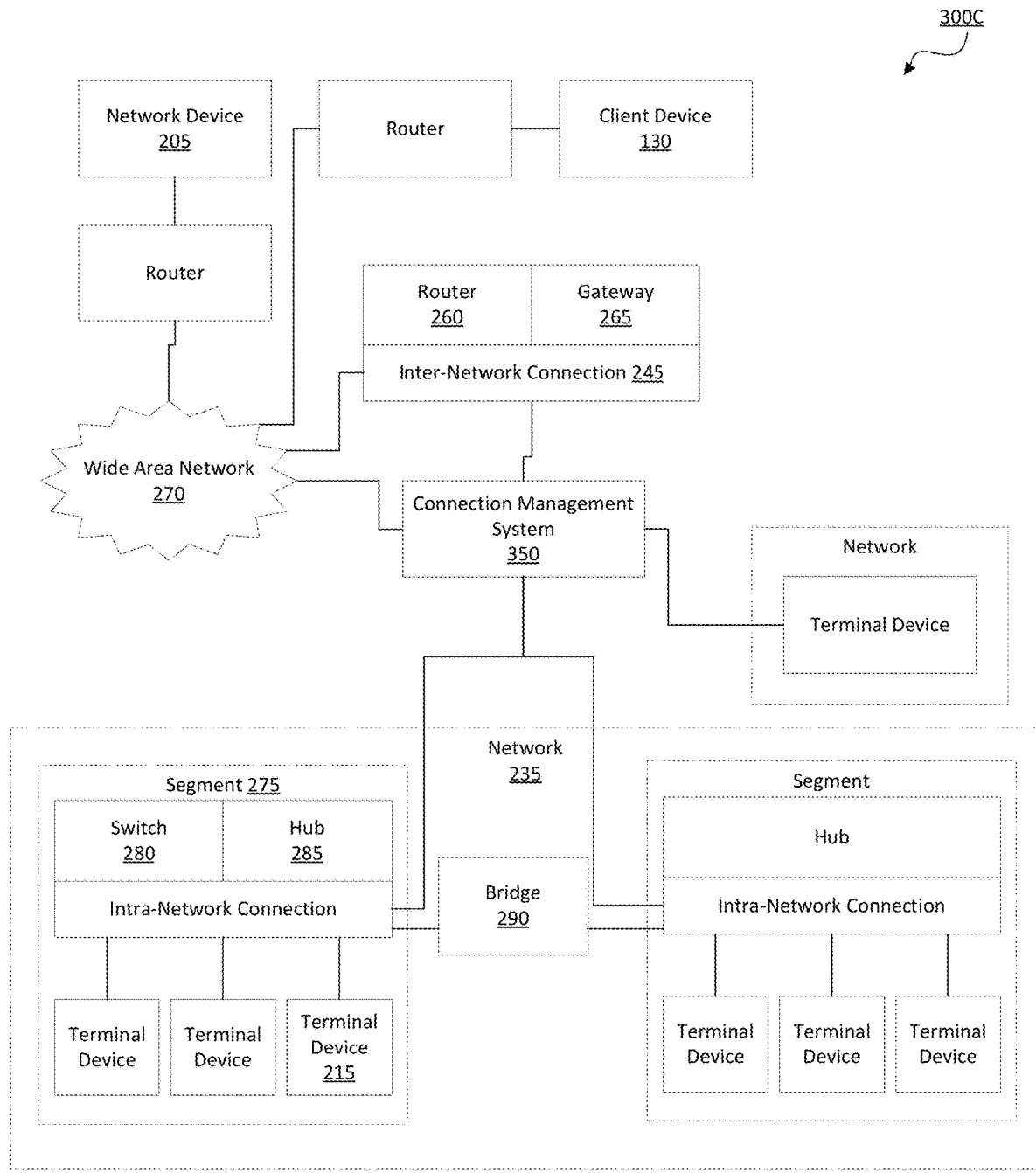

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350*b* executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350*b* may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
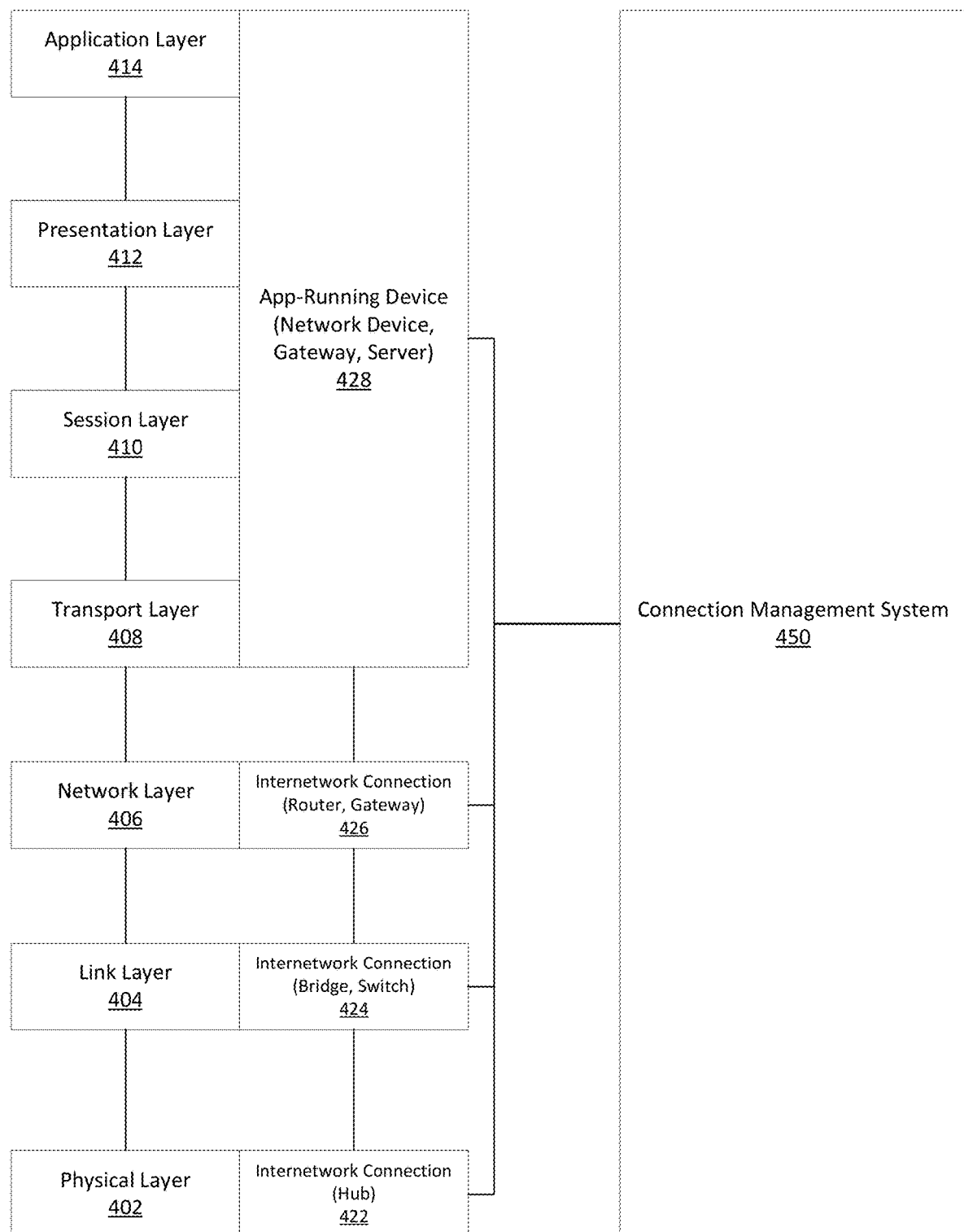
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
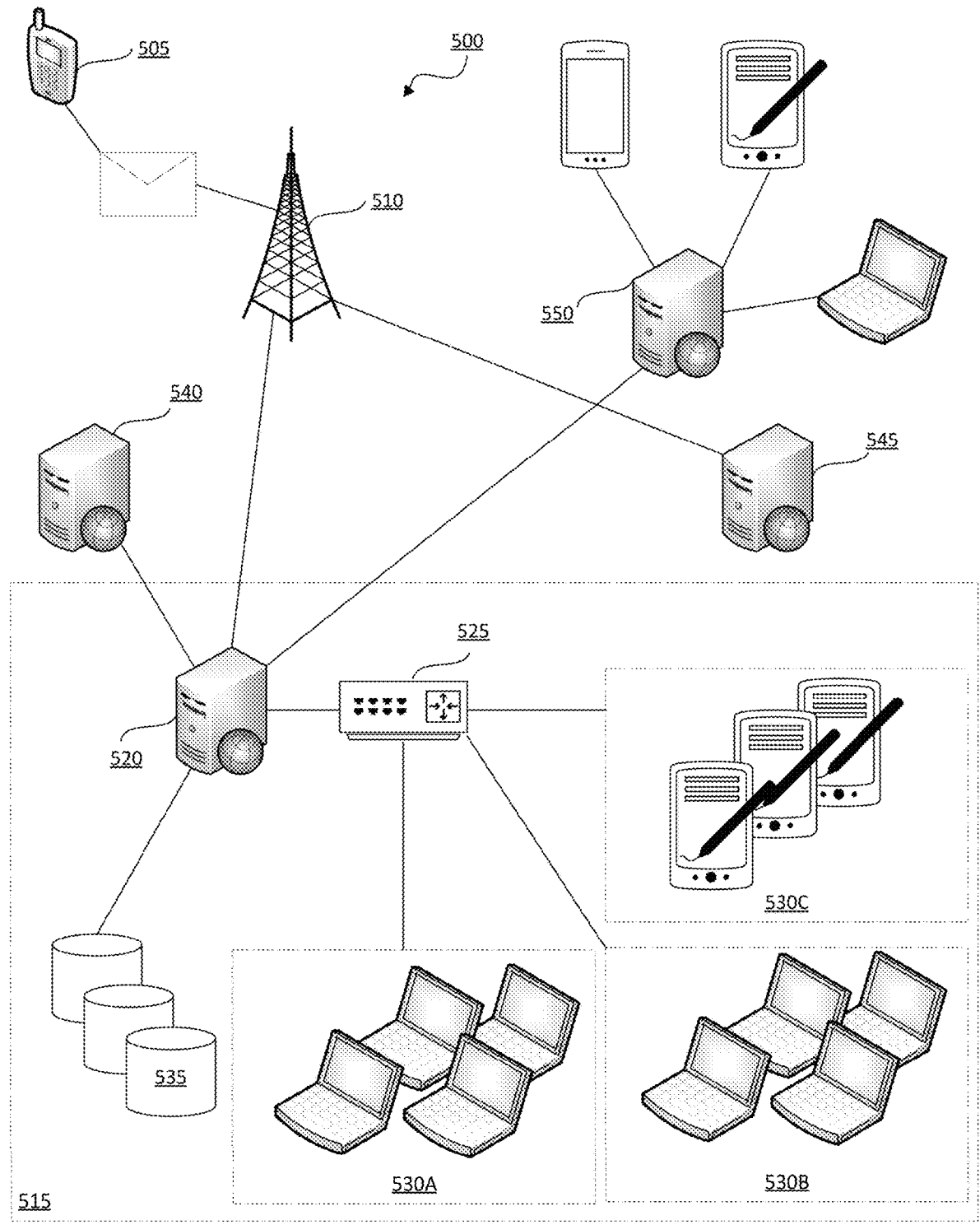
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
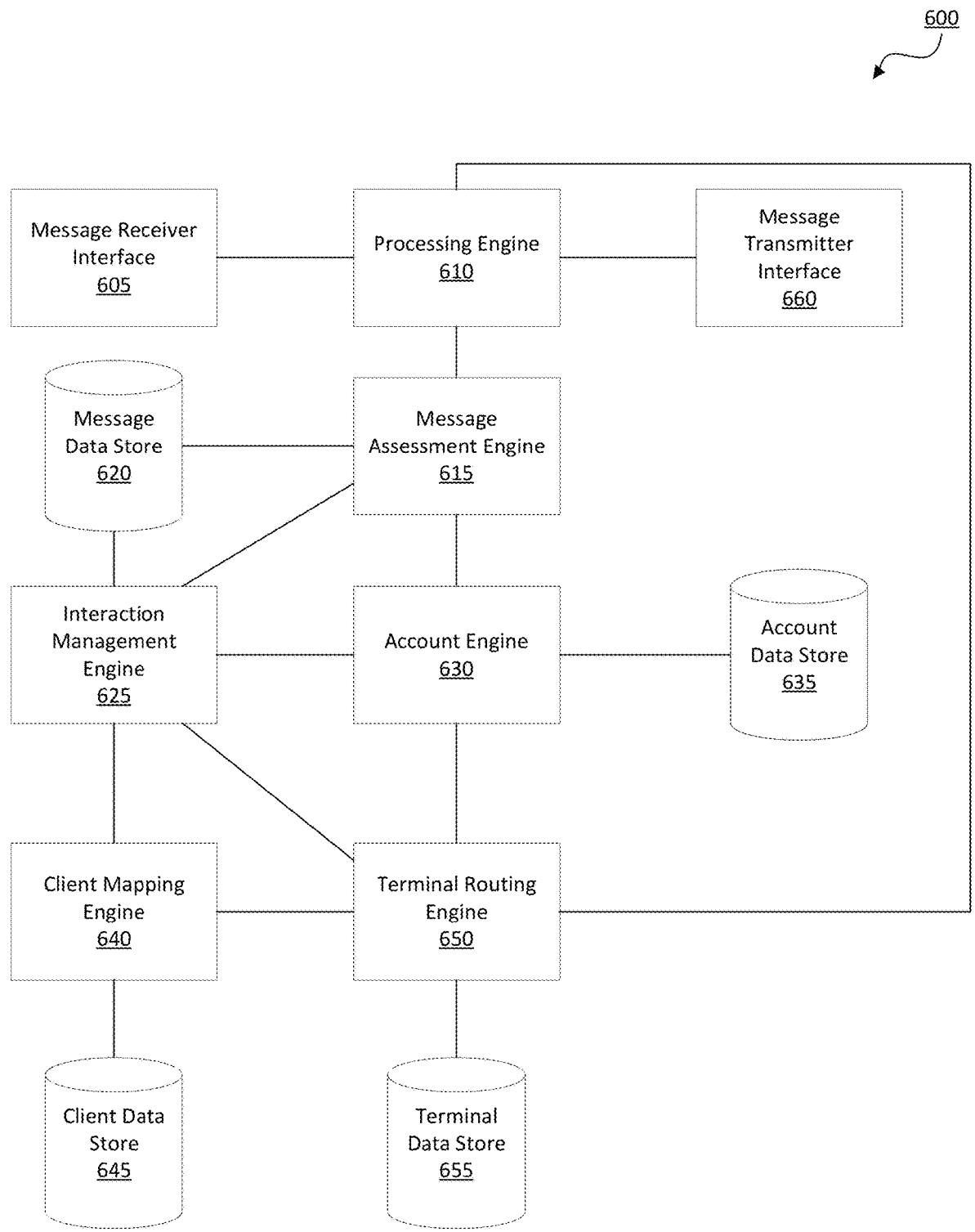
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 625 can (for example) determine whether a terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and methods for dynamically switching between bots and user devices (e.g., operated by live users) during communication sessions with network devices (e.g., operated by users) is provided. In some implementations, bots can be configured to autonomously communicate with network devices. Further, bots can be configured for a specific capability. Examples of capabilities can include updating database records, providing updates to users, providing additional data about the user to agents, determining a user's intent and routing the user to a destination system based on the intent, predicting or suggesting responses to agents communicating with users, escalating communication sessions to include one or more additional bots or agents, and other suitable capabilities. In some implementations, while a bot is communicating with a network device (e.g., operated by the user) during a communication session (e.g., using a chat-enabled interface), a communication server can automatically and dynamically determine to switch the bot with a user device. For example, bots can communicate with users about certain tasks (e.g., updating a database record associated with a user), whereas, terminal devices can communicate with users about more difficult tasks (e.g., communicating using a communication channel to solve a technical issue).

In some implementations, determining whether to switch between a bot and a user device during a communication session can be based on an analysis of one or more characteristics of the messages in a communication session. Further, a dynamic sentiment parameter can be generated to represent a sentiment of messages, conversations, entities, agents, and so on. For example, in cases where the dynamic sentiment parameter indicates that the user is frustrated with the bot, the system can automatically switch the bot with a user device so that a live agent can communicate with the user. See U.S. Ser. No. 15/171,525, filed Jun. 2, 2016, the disclosure of which is incorporated by reference herein in its entirety for all purposes. In some examples, determining whether to switch between the bots and user devices can be performed without a prompt from a user. The determination can be performed automatically at the communication server based any number of factors, including characteristics of the current messages in the communication session (e.g., chat), characteristics of previous messages transmitted by the user in previous communication sessions, a trajectory of a characteristic (e.g., a sentiment) over multiple messages in a conversation, or additional information associated with the user (e.g., profile information, preference information, and other suitable information associated with the user).

Figure 7:
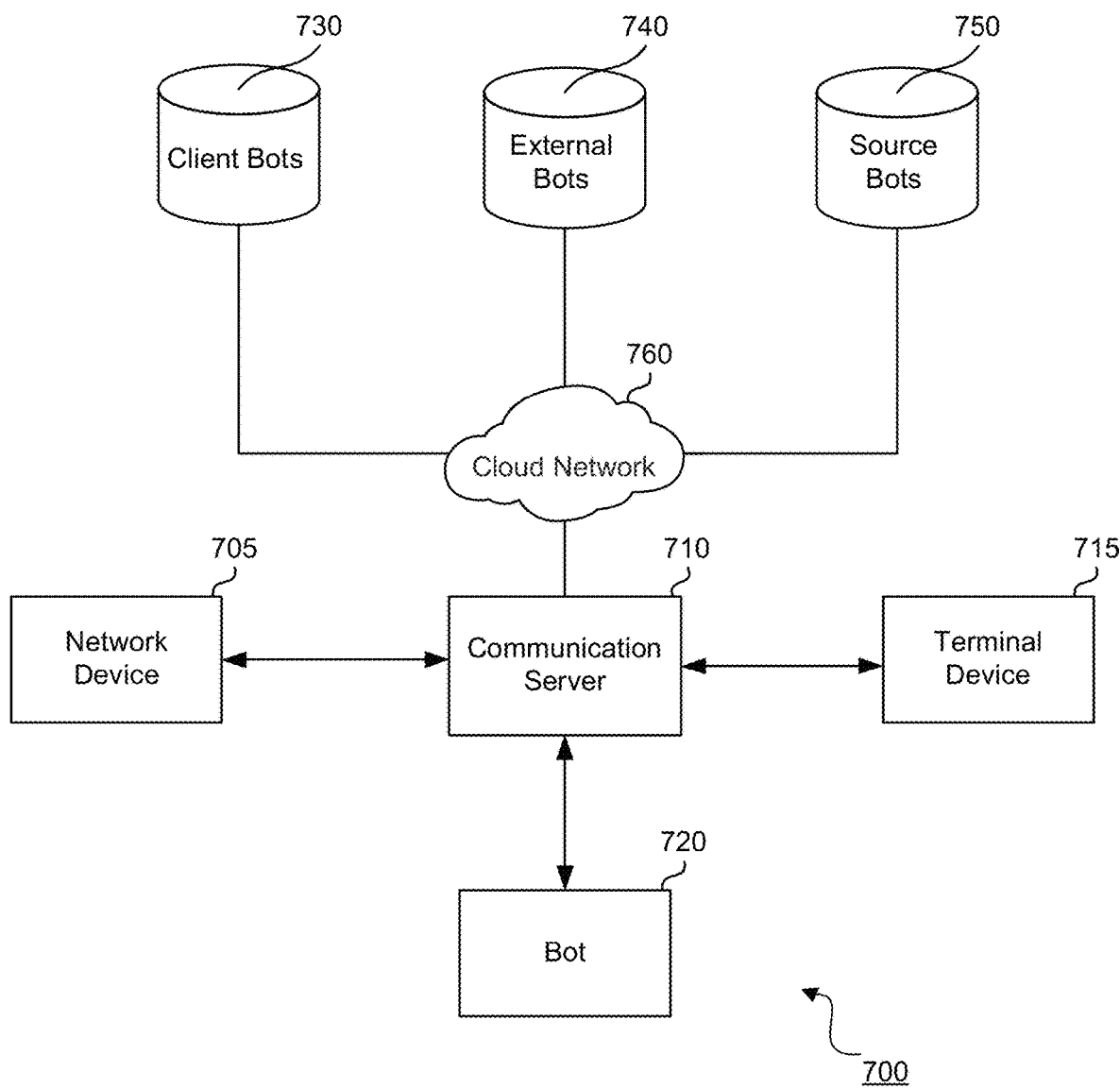
FIG. 7 shows a block diagram of a network environment for dynamically switching between bots and user devices during communication sessions.

FIG. 7 shows a block diagram of a network environment for dynamically switching between bots and user devices during communication sessions. In some implementations, network environment 700 can include network device 705, communication server 710, user device 715, and bot 720. Communication server 710 can be a server with one or more processors with at least one storage device, and can be configured to perform methods and techniques described herein. For example, communication server 710 can manage communication sessions between network devices (e.g., operated by users) and terminal devices (e.g., operated by agents). Communication server 710 can establish a communication channel between network device 705 and user device 715 so that network device 705 and user device 715 can communicate with each other during a communication session. A communication session can facilitate the exchange of one or more messages between network device 705 and user device 715. The present disclosure is not limited to the exchange of messages during a communication session. Other forms of communication can be facilitated by the communication session, for example, video communication (e.g., a video feed) and audio communication (e.g., a Voice-Over-IP connection).

In some implementations, communication server 710 can establish a communication channel between network device 705 and bot 720. Bot 720 can be code that, when executed, is configured to autonomously communicate with network device 705. For example, bot 720 can be a bot that automatically generates messages to initiate conversations with the user associated with network device 705 and/or to automatically respond to messages from network device 705. In addition, communication server 710 can be associated with a platform. Clients (e.g., an external system to the platform) can deploy bots in their internal communication systems using the platform. In some examples, clients can use their own bots in the platform, which enables clients to implement the methods and techniques described herein into their internal communication systems.

In some implementations, bots can be defined by one or more sources. For example, data store 730 can store code representing bots that are defined (e.g., created or coded) by clients of the communication server. For example, a client that has defined its own bots can load the bots to the communication server 710. The bots defined by clients can be stored in client bots data store 730. Data store 740 can store code representing bots that are defined by third-party systems. For example, a third-party system can include an independent software vendor. Data store 750 can store code representing bots that are defined by an entity associated with communication server 710. For example, bots that are coded by the entity can be loaded to or accessible by communication server 710, so that the bots can be executed and autonomously communicate with users. In some implementations, communication server 710 can access bots stored in data store 730, data store 740, and/or data store 750 using cloud network 760. Cloud network 760 may be any network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

In addition, user device 715 can be operated by a user. User device 715 can be any portable (e.g., mobile phone, tablet, laptop) or non-portable device (e.g., electronic kiosk, desktop computer, etc.). In some instances, the agent can access a website using a browser that is running on user device 715. For example, the website can include a console or platform that is running on the browser of user device 715. The agent can be logged into the platform using the browser. One or more login credentials (e.g., username, password, and the like) can be used to authenticate the agent's identity before allowing the agent to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent to communicate with a user, and to view communications between the user and one or more bots.

In some implementations, communication server 710 can be configured to dynamically switch between bot 720 and user device 715 during a particular communication session. For example, communication server 710 can facilitate a communication session between network device 705 and bot 720. Bot 720 can be configured to autonomously communicate with network device 705 by exchanging one or more messages with the network device 705 during the communication session. Communication server 710 can dynamically determine whether to switch bot 720 with user device 715 (or in some cases, vice versa) so that a live agent can communicate with network device 705, instead of bot 720. In some implementations, the switching can be performed without a prompt from the network device 705 or user device 715. For example, the switching can be based on message parameters (e.g., scores representing sentiment of a message or series of messages) of the messages exchanged between the network device 705 and the bot 720, without prompting the network device 705 to request a terminal device.

In some implementations, communication server 710 can determine to switch between bot 720 and user device 715 automatically based on characteristics of the messages exchanged between the bot 720 and the network device 705. In some instances, analyzing the text of a message to determine the characteristic (e.g., the message parameter) can include an analysis of textual or non-textual attributes associated with the message. For example, communication server 710 can extract one or more lines of text included in the message from network device 705. Communication server 710 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). For example, a term "dispute" for one client can be negative, but can be neutral or positive for a second client. In some instances, anchors can be dynamically determined using supervised machine learning techniques. For example, one or more clustering algorithms can be executed on stored messages to find patterns within the stored messages. The clustered messages can be further filtered and evaluated to determine the anchor. Further, one or more words near the identified anchor can be parsed for amplifiers. An example of an amplifier is a term that increases or decreases an intensity associated with the polarity of the anchor, such as "really," "not really," "kind of," and so on. The characteristic can include, for example, the speed of typing, the number of special characters used in the message (e.g., exclamation points, question marks, and so on), a semantic analysis of a message (e.g., by identifying keywords, sentence structures, repeated words, punctuation characters and/or non-article words); user input (e.g., having selected one or more categories); and/or message-associated statistics (e.g., response latency).

As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). In some instances, the message parameter can be used to determine which secondary queue is to store the communication.

In some implementations, the characteristic of a message can be the sentiment associated with the message. The message parameter can represent the sentiment of the message. For example, if the sentiment of the message is happy, the message parameter can be a certain value or range of values, whereas, if the sentiment of the message is angry, the message parameter can be another value or range of values. Determining whether to switch between the bots and the terminal device can be based on the message parameter, which is continuously and automatically updated with each new message received at communication server 710.

In some implementations, communication server 710 may recommend or predict responses to messages received from network device 705. For example, communication server 710 can include a message recommendation system, which can evaluate messages received from network device 705 and use a machine-learning model to recommend responses to those received messages. The message recommendation system can display a set of recommended messages on user device 715 to assist the agent in communicating with network device 705.

Figure 8:
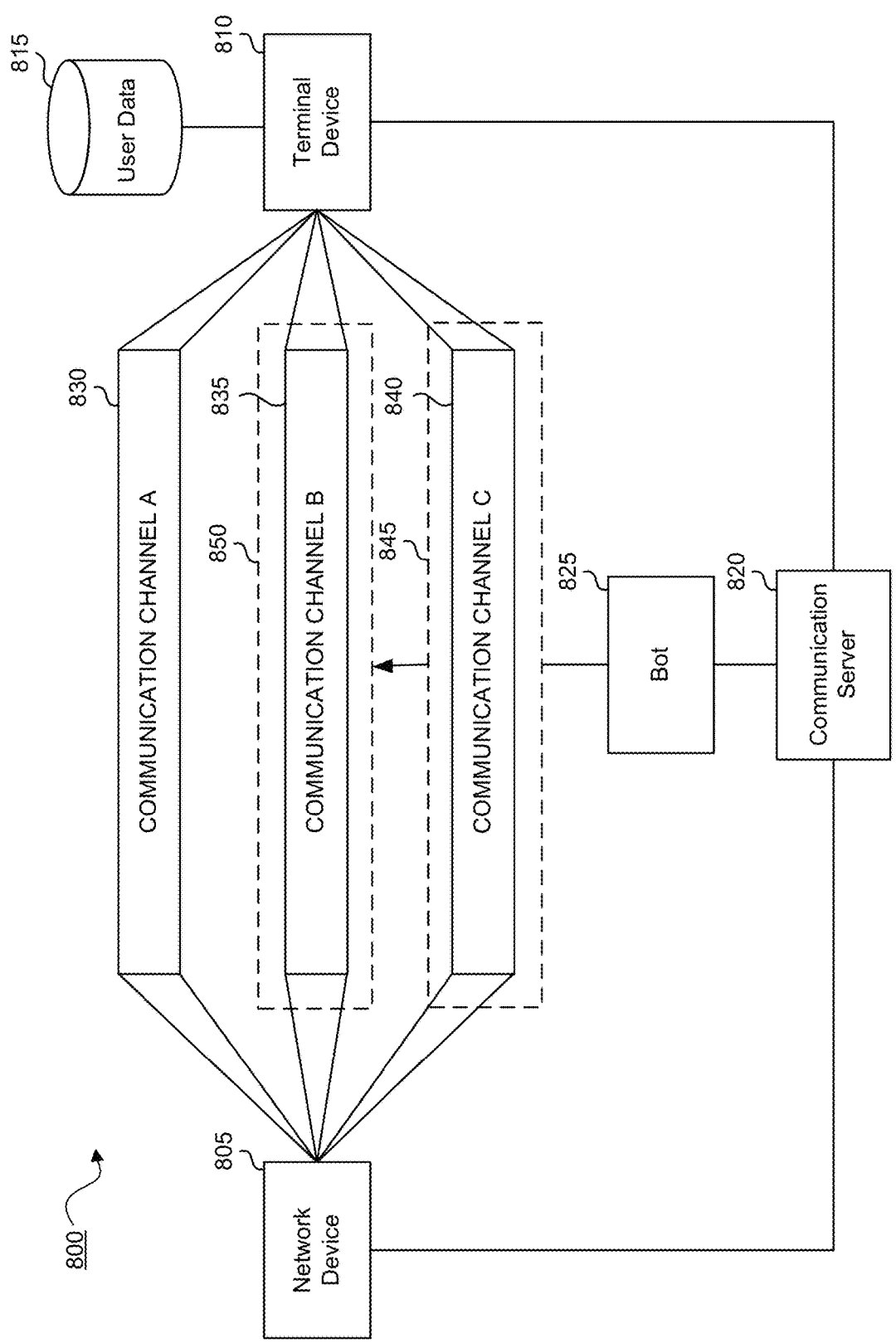
FIG. 8 shows a block diagram representing a network environment for dynamically selecting endpoints across multiple channel environments.

FIG. 8 shows a block diagram representing network environment 800 for dynamically selecting endpoints across multiple communication channels. In some implementations, network environment 800 may include network device 805, user device 810, and communication server 820. Network device 805 may be similar to network device 705, and thus, a description is omitted here for the sake of brevity. User device 810 may be similar to terminal device 715, and thus, a description is omitted here for the sake of brevity.

Communication server 820 may be similar to communication server 710, and thus, a description is omitted here for the sake of brevity.

Communication server 820 may establish or facilitate the establishment of a communication channel between network device 805 and user device 810. As illustrated in FIG. 8, communication server 820 may establish communication channel C 840, which enables network device 805 and user device 810 to exchange one or more messages. As a non-limiting example, communication channel C 840 may be a web chat feature of a website, communication channel B 835 may be a chat application running on a mobile device (e.g., a smart phone), and communication channel A 830 may be a voice over Internet Protocol (VOIP) audio channel that enables the agent to communicate with the user.

Communication server 820 may configure bot 825 to autonomously communicate with network device 805. In some implementations, bot 825 may access and execute one or more protocols that enable bot 825 to communicate with network device 805 using communication channel C 840. Continuing with the non-limiting example above, bot 825 may access and execute a protocol for communicating over the web chat feature of the website. In this example, the protocol may include a coding language specific to the web chat feature for exchanging messages using the web chat feature. The protocol may include code that, when executed, converts a message (e.g., a string of text or other content) inputted by an agent at terminal device 810 into structured content (e.g., content separated into independent data fields), and maps the structured content to elements of the web chat feature of the website. As input is received at terminal device 810 (e.g., by the agent), bot 825 can translate the structured content to the elements of the web chat feature to enable the message to be communicated using the web chat feature.

In some implementations, bot 825 can also be configured to communicate with network device 805 using communication channel B 835. Communication channel B 835 can be a different communication channel from communication channel C 840. Further, communication channel B 835 may require different elements to facilitate communication than the elements required for communication channel C 840. Bot 825 can be configured to translate the structured content to the elements of communication channel B 835. Continuing with the non-limiting example described above, communication channel B 835 may be an in-app chat feature of a native application running on a smart phone. One or more elements may be required in order to facilitate communication using communication channel B 835. For example, FACEBOOK MESSENGER may be the native application running on the smart phone. In this example, the one or more elements of FACEBOOK MESSENGER may be templates specific to FACEBOOK MESSENGER that are required to facilitate communication using FACEBOOK MESSENGER. The protocol that enables bot 825 to communicate using communication channel B 835 may map the structured content to the templates of the FACEBOOK MESSENGER native application in order to transmit the structured content as a message within the FACEBOOK MESSENGER application.

In some examples, a mobile application (e.g., a mobile native application) may include executable code (stored in the mobile device or at one or more external servers) that can be executed using the operating system of the network device (e.g., a smartphone). In some examples, the mobile application may include a hybrid mobile application that is comprised of native user interface (UI) components (generated and stored at the mobile device), but is written in an interpreted language (e.g., using Web-based coding languages). The present disclosure is not limited to mobile native applications or hybrid applications, and thus, any type of mobile application may be used in the methods described herein.

In some implementations, bot 825 can also be configured to communicate with network device 805 using communication channel A 830. Communication channel A 835 can be a different communication channel from communication channel C 840 and communication channel B 835. Further, communication channel A 830 may require different elements to facilitate communication than the elements required for communication channel C 840 and for communication channel B 835. Bot 825 can be configured to translate the structured content to the elements of communication channel A 830. Continuing with the non-limiting example described above, communication channel A 830 may be a VOIP audio communication link between network device 805 and user device 810. One or more elements may be required in order to facilitate communication using communication channel A 830. The protocol may include a mapping of the structured content to the elements associated with communication channel A 830.

In some implementations, communication server 820 may be configured to dynamically, autonomous, and/or automatically transfer a communication session between different communication channels, so that bot 825 can continuously communicate with network device 805, regardless of the communication channel. For example, network device 805 may be communicating with user device 810 using a first communication channel 845 (i.e., communication channel C 840). Network device 805 may transmit a message indicating that the user operating network device 805 intends to change the communication channel currently being used for the communication session. For example, network device 805 may indicate that second communication channel 850 is the target communication channel for continuing the communication session with user device 810. Bot 825 can automatically detect the indication that the communication channel should be changed from first communication channel 845 to second communication channel 850. For example, bot 825 may continuously evaluate messages exchanged during the communication session to detect that the communication channel should be changed. Upon detecting the indication that the communication channel should be changed, communication server may identify the user identifier associated with network device 805. For example, user data database 815 may store user identifiers for various users. A user identifier may be a string of text and/or numbers that uniquely identifies a network device. If, at any given time, communication server 820 determines that the same user identifier is associated with two active communication channels, communication server 820 can recognize that the network device is requesting to continue a communication session but to change the communication channels.

Communication server 820 may be configured to support continuity between different communication channels. For example, the target communication channel (e.g., second communication channel 850) can be automatically used by bot 825 to continue the communication session with network device 805, but using second communication channel 850, instead of first communication channel 845. In some implementations, bot 825 may automatically transmit a message to network device 805 using second communication channel 850. Transmitting the message to network device 805 may indicate to network device 805 that the transfer of communication channels is complete. In some implementations, communication server 820 may automatically detect that the communication channel has been changed from first communication channel 845 to second communication channel 850. For example, communication server 820 may recognize the user identifier associated with network device 805 when network device 805 is communicating with bot 825 using first communication channel 845. If network device 805 begins using second communication channel 850 (e.g., without indicating the intention to change communication channels during the communication session), communication server 820 can automatically detect that the user identifier for network device 805 is currently associated with two active communication channels (e.g., first communication channel 845 and second communication channel 850). Communication server 820 can detect that first communication channel 845 is associated with a recent history of messages (e.g., messages transmitted or exchanged within the last five minutes) and that second communication channel 850 is not associated with a recent history of messages (e.g., within the last few minutes). As a result, communication server 820 can determine that network device 805 is requesting to transfer the communication session from first communication channel 845 to second communication channel 850. Communication server 820 can implement the transfer by accessing the protocol associated with second communication channel 850, and executing bot 825 using the accessed protocol to enable bot 825 or user device 810 to communicate with network device 805 using second communication channel 850, instead of using first communication channel 845.

In some implementations, one or more machine-learning techniques can be used to identify patterns in the communication channel usage of network device 805. For example, the usage of communication channels by network device 805 can be tracked and recorded (and stored as historical data). Machine-learning techniques can be applied to the historical data to identify which communication channel network device 805 is most likely to use when communicating with a particular entity (e.g., bot, company, terminal device, agent, and so on). When initiating communications from user device 810 (or bot 825 or any other terminal device) to network device 805, communication server 820 can establish a communication channel of the type that network device 805 is most likely to use (based on the results of the machine learning techniques). As network device 805 begins to use a different communication channel more frequently, communication server 820 can identify this changing trend and initiate communication sessions using the most used or most frequently used communication channel.

Figure 9:
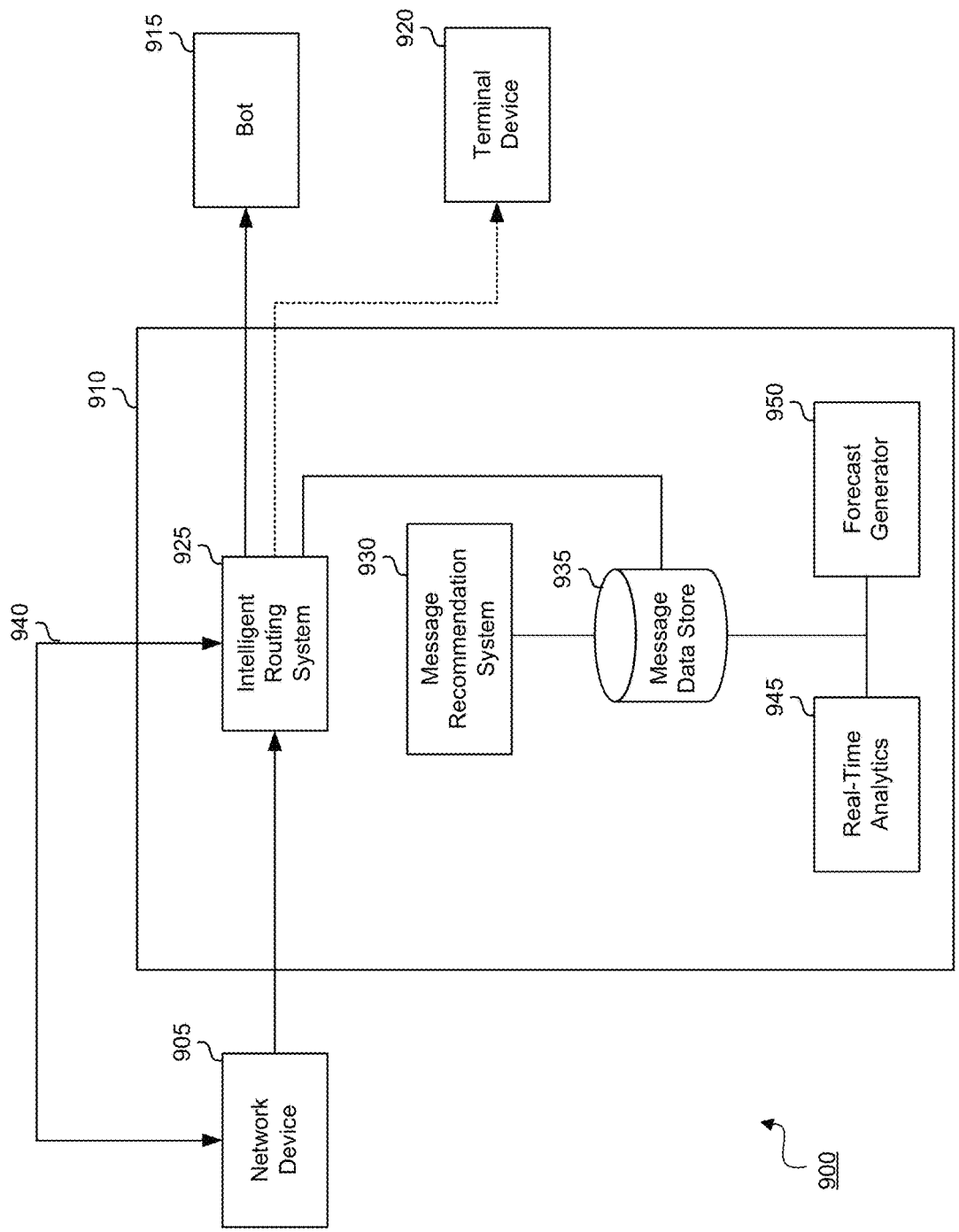
FIG. 9 shows a block diagram representing a network environment for monitoring endpoint communications using machine-learning techniques.

FIG. 9 shows a block diagram representing network environment 900 for monitoring endpoint communications using machine-learning techniques. Network environment 900 may include network device 905 (operated by a user), communication server 910, bot 915 and user device 920. Communication server 910 can facilitate the establishment of a communication channel that enables network device 905 and at least one bot 915 and terminal device 920 to communication.

Communication server 910 may include intelligent routing system 925, message recommendation system 930, and message data store 935. Each of intelligent routing system 925 and message recommendation system 930 may include one or more computing devices with a processor and a memory that execute instructions to implement certain operations. In some implementations, intelligent routing system 925 may be a bot configured to intelligently route communications received from network devices to the appropriate destination. Intelligent routing system 925 may include one or more processors configured to execute code that causes one or more machine-learning techniques or artificial intelligence techniques to intelligently route messages. In some implementations, intelligent routing system 925 can execute one or more machine-learning techniques to train a model that predicts a destination associated with a message received from network device 905.

As a non-limiting example, intelligent routing system 925 may receive a message from network device 905 through a communication channel established or facilitated by communication server 910 (e.g., a native application configured to enable users to communicate with each other across various devices). Intelligent routing system 925 may evaluate the incoming message according to certain embodiments described above. For example, intelligent routing system 925 may evaluate the content (e.g., text, audio clips, images, emoticons, or other suitable content) included in the received message using a trained machine-learning model. The content of the message can be inputted into the machine-learning model to generate a predicted destination (e.g., a particular terminal device or bot). The machine-learning model may be continuously trained based on feedback signal 940 received from network device 905. In some implementations, intelligent routing system 925 may request an acknowledgement from network device 905 of the predicted destination. As a non-limiting example, intelligent routing system 925 may evaluate the message using a machine-learning technique, and a result of the evaluation may include a predication that bot 915 is the destination for the message. To confirm, intelligent routing system 925 may automatically request feedback signal 940. For example, feedback signal 940 may include a request for network device 905 to acknowledge whether bot 915 is the correct destination for the message (e.g., "Is Technical Support the correct destination?"). If network device 905 transmits the acknowledgement that bot 915 is the correct destination (e.g., the destination intended by the user operating network device 905), then intelligent routing system 925 may train the machine-learning model to predict that future messages including the exact or similar content (e.g., a threshold of similarity, such as 10 percent difference in content) as the received message are to be routed to bot 915. However, if intelligent routing system 925 receives feedback signal 940 indicating that bot 915 is not the correct or intended destination for the received message, but rather user device 920 was the correct or intended destination, intelligent routing system 925 can train the machine-learning model that future messages including the exact or similar content as the received message are to be routed to user device 920 (instead of bot 915). In some implementations, intelligent routing system 925 may not immediately update or train the machine-learning model to route future messages to terminal device 920, but rather, intelligent routing system 925 may wait for a threshold number of incorrect routings to bot 915 before routing all future messages with the exact same or similar content as the received message to user device 920. As a non-limiting example, intelligent routing system 925 may begin routing future messages (that were predicted to be routed to bot 915) to user device 920 instead of bot 915 after five instances of network devices transmitting feedback signals indicating that bot 915 is not the correct or intended destination.

In some embodiments, intelligent routing system 925 may select where to route a given message based on factors associated with handling a particular request in the message. Intelligent routing system 925 may broadcast an intent to disparate services and determine who wants to bid on handling the request. Parties may respond with their level of confidence in successfully handling the request and a plan to execute handling of the request. Intelligent routing system 925 may evaluate all of the responses from the bidding parties and, based on machine learning policies, determine which bidding party to use for a given message.

Message data store 935 may store some (e.g., but not all) or all messages received in the past from one or more network devices. Further, message data store 935 may also store some or all messages transmitted by terminal devices or bots during previous communication sessions with network devices. Message data store 935 may also store some or all messages transmitted by network devices to bots during communication sessions. Further, message data store 935 may store some or all messages transmitted by bots to network devices during communication sessions. In some implementations, message data store 935 may be a database of all messages processed (e.g., transmitted by or received at) communication server 910.

Message recommendation system 930 may analyze the database of messages stored at message data store 935. The database of messages in message data store 935 may be inclusive of one or more questions-and-answers, query-and-responses, and other sets of communications between a user and bots, agents, or other endpoints. The communication sets may further be associated with ratings or assessments on the success of the communications with the user. In some embodiments, message recommendation system 930 may solicit questions-and-answers from users identified as having expertise regarding the subject matter of the questions and answers. Selected question-and-answer sets may further be provided and presented to a user of network device 905 by message recommendation system 930. Information regarding selection of a particular question-and-answer set by the user of network device 905 may be tracked in message data store 935, as well as used by intelligent routing system 925 to connect network device 905 to the user device 920 of the expert associated with the selected question-and-answer. The success or lack thereof in the interaction between network device 906 and user device 920 (as indicated by assigned scores or observed indicators of user satisfaction) may further be stored in message data store 935 and subsequent used to refine subsequent routing decisions. For example, successful interactions with the expert of user device 920 may be used to route more subsequent conversations involving the subject matter of the question-and-answer.

In some implementations, message recommendation system 930 may evaluate the messages stored at message data store 935 using one or more machine-learning algorithms or artificial intelligence algorithms. For example, message recommendation system 930 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of messages stored in message data store 935. In some implementations, a recurrent neural network (RNN) or a convolutional neural network (CNN) may be used to predict response messages to assist the agent. In some implementations, message recommendation system 930 may use support vector machines (SVM), supervised, semi-supervised, ensemble techniques, or unsupervised machine-learning techniques to evaluate all previous messages to predict responses to incoming messages received from network devices during communication sessions. For example, message recommendation system 930 may evaluate the content of messages received from network devices (or messages received at communication server 910 from bots or terminal devices) and compare the results of the evaluation to the one or more clusters of previous messages stored in message data store 935. Once the cluster is identified, message recommendation system 930 can identify the most relevant response messages based on a confidence threshold. For example, an incoming message (e.g., received at communication server 910 from network device 905) may correspond to a technical issue based on the content of the incoming message. Message recommendation system 930 can identify that the incoming message corresponds to a technical issue based on an evaluation of the content of the incoming message (e.g., text evaluation). Message recommendation system 930 can access message data store 935 to identify the cluster of messages associated with technical issues. Message recommendation system 930 can select one or more responses messages (and associated endpoints) within the cluster of messages based on a confidence threshold. For example, experts on the technical issue may be identified as having successfully resolved similar issues in the past and based on the identification, may be dynamically routed to the network device 905 who either communicates or is observed to exhibit indicators of the technical issue. As a non-limiting example, a confidence algorithm can be executed to generate a confidence score. A confidence score may be a percentage value where the lower the percentage, the less likely the response is a good prediction for the incoming message, and the higher the percentage, the more likely the response is a good prediction for the incoming message. A minimum confidence threshold may be defined as a measure of certainty or trustworthiness associated with each discovered pattern.

Message data store 935 may also provide historical and real-time message data to real-time analytics module 945 and forecast generator 950. As messages are routed by intelligent routing system 925, the messages and related data may be saved to message data store 935. In particular, message data store 935 may store data relevant to forecasting analytics, including data regarding or otherwise indicative of the times of message arrival, agent handle time for each message, agent handle time for messages associated the same task (e.g. intent), agent handle time for each skill associated with each task, agent load/occupancy during the messaging session, total agent handle time per interaction, end-user responses, and end-user satisfaction levels.

As messages are being routed and stored in message data store 935, such messages may also be analyzed by real-time analytics module 945 in real-time and in context with other messages in message data store 935. The analysis may be based on historical messages associated with a particular entity, entities in a particular industry or market, or in aggregate across the system. Depending on the metric being analyzed, different learning models may be developed and refined by agent, task, skill, entity, industry/market, or in aggregate. Thus, artificial intelligence or machine learning techniques may be applied to analyze messaging staff data, so as to generate insights and identify patterns, trends, and correlations between such factors regarding agent time, task, skill, and resulting customer satisfaction and other positive sentiment levels. Further, such analyses may be dynamically performed in real-time as new incoming messages are being communicated, such that the analytical data regarding agent, task, skill, etc., may likewise be dynamically generated in real-time.

Real-time analytics 945 may evaluate a total amount of time associated with a messaging session between a user 110 of network device 105 and an agent 120 of terminal device 115. Such evaluation may further provide for different portions of the messaging session to be characterized based on task and associated skill(s). As such, different time periods during the messaging may be attributed to an identified task and associated skill(s). An particular agent 120 may be identified as having spent certain amounts of time spent on identified types of tasks or exercising identified skill(s). Such agent times, tasks, and skills may further be correlated with customer satisfaction levels under different conditions.

As noted above, a forecast may be based on historical data (e.g., for the entity, entity business type, aggregate) that may be analyzed to identify and characterize how past messaging conversations have been conducted. Such analysis may identify and measure conversational parameters, such as arrival rates (message traffic volume), agent net handle time, agent load/occupancy, and labor hours. Arrival rates may further specify, for example, how many conversations (and portions thereof) were associated with a specific skill type (e.g., billing questions, returns, order status).

Agent net handle time may identify an amount of time an agent spent actively working on handling conversations associated with the specific skill. Agent net handle time may further determine the cost of the issue requiring the specified skill, paid by the entity per application. Agent load/occupancy may measure (e.g., as a percentage) how loaded an entity's agents were in terms of occupancy. Typically, brands want to be at 90% load/occupancy. Further, total labor hours may include potential-handling-time, plus periods during which the agent was online, even if no actual work was done.

In addition, analysis may further categorize agent time by tracking the dynamics of an agent's concurrent messaging conversation and attributing various time periods to specific conversations and conversational events, as well as identifying time periods during which the agent may be idle. Such analysis may use natural language understanding (NLU) algorithms and insights to identify specific intents/issues, which may be correlated to specific skills. The results of such analyses allows for staffing forecasts to take into account service time by different skills, as well as to quantify and evaluate the work associated with different resolution types, improve load predictions, assess the cost of switching between concurrent conversations, and determine recommended staffing levels by type for a desired outcome.

While historical data from different entities or from different time periods may vary in terms of the types of data that have been tracked, certain patterns may nevertheless be identified. For example, some historical data may include user interface (UI) events, such as button presses, tab selections, typing indications, etc. Conversational events may nevertheless be identified by way of defined events and logic by which conversations are conducted. Such analyses may take place in real-time and used to generate real-time analytics across a variety of different parameters and targets of interest. Further, the real-time analytics may be used to dynamically generate or update staffing forecasts for an entity.

Based on real-time analytics from real-time analytics 945, forecast generator 950 may generate staffing forecasts for an entity. For example, the generated forecast may specify a volume forecast or number of full time equivalent staff members by skill needed per time period to result in a target service level. In addition, the generated forecast may also be used to predict future service quality given the current staffing plan and volume forecast. Such analyses can be done both as part of long-term planning and as a tool driving real-time management decisions about adjustments of workforce levels.

Such forecasts and notifications thereof may be generated and updated upon request, in real-time, or triggered when certain thresholds or indicators are met or exhibited by messaging data. For example, a forecast may be automatically triggered based on unusually heavy messaging volume. Forecast generator 950 may therefore generate the staffing forecast based on the real-time data provided by real-time analytics 945 and one or more targets defined by the associated entity. As discussed herein, different entities may define different types of targets based on different priorities. For example, an entity may define a target level of load (e.g., 90%) for agents 120 associated with sales and product orders and a different target load for agents 120 associated with technical assistance or product returns.

Further, the forecast may be dynamically adjusted based on known upcoming changes, growth patterns, updated targets, and other updated parameters. Additionally, seasonal fluctuations (e.g., holidays) may be predicted and used to adjust forecasts. Likewise, such entity events as new marketing campaigns may be predicted to cause certain changes in staffing requirements (e.g., volume, associated types of skills).

Figure 10:
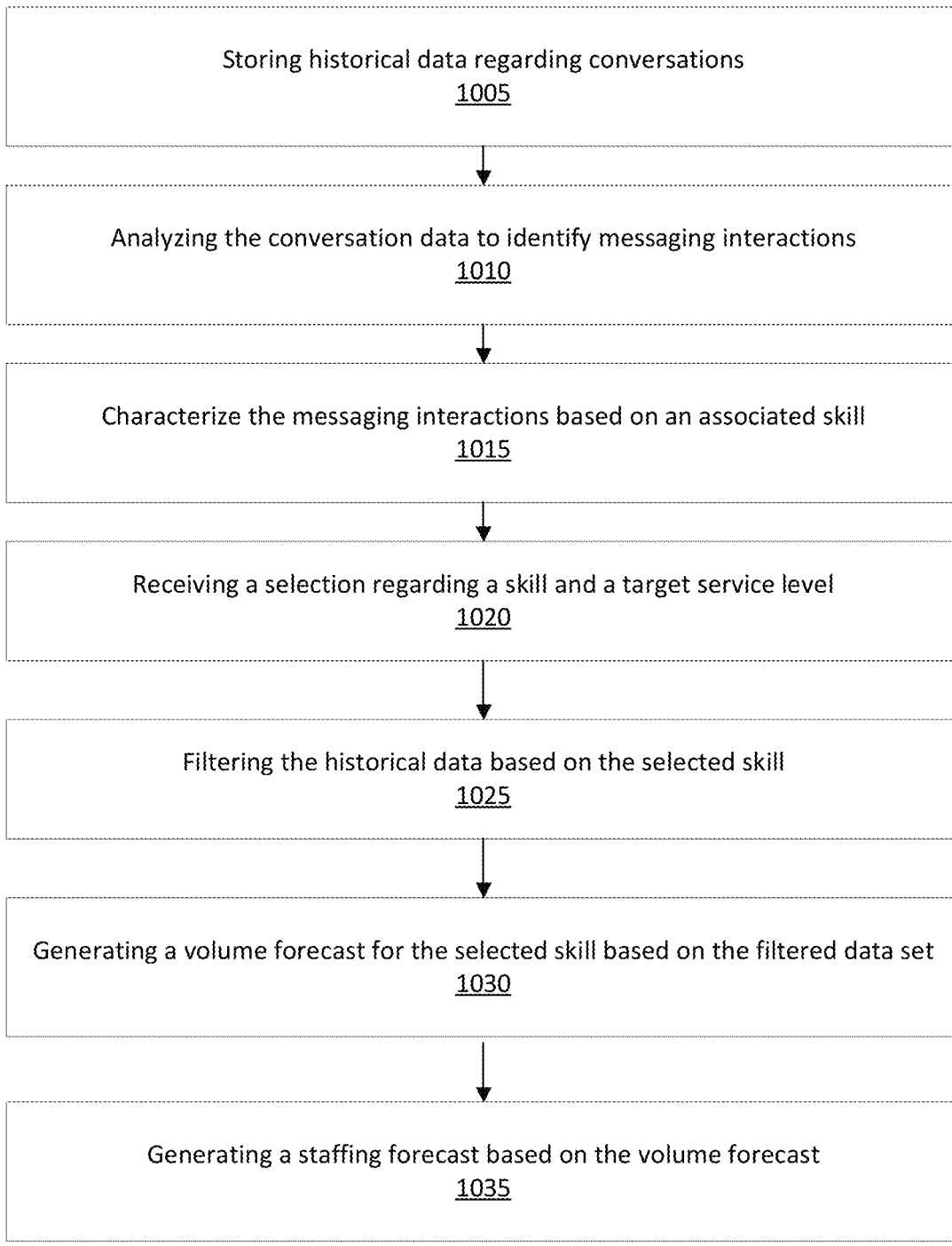
FIG. 10 shows an example process for dynamic generation of staff forecasts.

FIG. 10 shows an example process for dynamic generation of staff forecasts. Such forecasts may be generated by forecast generator 950, which may be installed or associated with communication server 910. Operating in conjunction with other components of communication server 910, forecast generator 950 uses real-time data and analytics (e.g., from real-time analytics 945) that is based on real-time messaging data to dynamically generate a staffing forecast that is predicted to meet an entity's defined targets.

In step 1005, historical data may be stored regarding a plurality of messaging conversations. The messaging conversations that may be used to generate forecasts may be associated with the particular entity, entity type, or an aggregated collection. In some embodiments, different sets of messaging data may be used to generate forecasts associated with different skills. For example, administrative skills (e.g., updating user 110 data) may be based on aggregated data sets, while entity-specific or industry-specific skills may be based on subsets of data. In some embodiments, an entity without any or much historical data may initially rely on messaging data associated with other entities, but over time, may incorporate more of their own data.

In step 1010, the conversation data may be analyzed to identify different messaging interactions taking place within a conversation. An exemplary analysis (of multiple such conversations as handled by an agent) is discussed in further detail in relation to FIG. 11. Such analysis may be performed by real-time analytics module 935 and may break down a conversation into components (sets of associated messages) or time periods. A component or time period may therefore be associated with identified intents, routing decisions, and tasks. Such analysis may be based on learning models of natural language understanding, as well as learning models associated with the entity or entity type.

Further, in step 1015, each component or time periods may be further analyzed and attributed to skills associated with identified intents, routing, and tasks. Further, the time periods may be characterized based on identified satisfaction or positive sentiment indicators or levels. As discussed above, agents may engage in multiple conversations simultaneously, and such concurrent activities may also be tracked to evaluate agent performance as to the number of concurrent conversations and associated satisfaction indicators. As a result of step 1015, an entity may be able to evaluate their messaging staff, as well as individual agents, regarding how load or occupancy relates to customer satisfaction. As such, the entity may be able to predict that certain staffing levels are likely to result in a desired (or undesired) level of customer satisfaction. Such predictions may further indicate a baseline minimum staffing level to handle certain volumes, as well as staffing levels needed to handle the same volumes while achieving certain targets of customer satisfaction. Further, the predictions may be granular and specific to the different types of skills of interest to the entity.

In step 1020, an entity may select a skill and target service level as the bases for a generated forecast. Thus, an entity may indicate a skill of interest and a desired service level for the same. Such selection may be input through a graphical user interface by one or more individuals associated with the entity. In some embodiments, the graphical user interface may include a menu that displays a variety of options corresponding to different available skills. The entity may therefore make the selections from the options, which may include individual skills or grouped sets of skill. For example, the menu may allow for selection of a suggested skill or group of skills relevant to the entity or entity type. Further embodiments of the graphical user interface may also include a variety of different settings upon which analytics and resulting forecast may be based. Exemplary graphic user interfaces are illustrated and discussed in further detail with respect to FIGS. 12, 13, and 15. Such selections received by the graphical user interface may be provided to real-time analytics 945, which performs the real-time data analytics based on the selections and setting selected or otherwise accepted by the entity.

In step 1025, the historical data may be filtered by real-time analytics 945 based on the selected skill set. The inputted selections may thereafter be used to filter the historical data and to analyze the filtered data to focus on the skill of interest. While the skill of interest may be analyzed across a variety of different service levels, the inputted target service level is used to further refine the filtered data. As a result, one or more staffing and messaging conditions and parameters may be identified as associated with the target service level. The identified conditions and parameters may include at least an identified minimum number of staffing agents having the selected skill over a period of time. In some instances, a recommendation may be formulated to further include a predetermined additional number so as to provide flexibility during periods of particularly heavy workflow or volume.

In step 1030, a volume forecast may be dynamically generated based on the filtered data set. Such volume forecast—illustrated and discussed in further detail with respect to FIG. 14—may be generated by forecast generator 950. A volume forecast may identify a number of conversations associated with the selected skill and target service level over a period of time, as well as how much time had been spent in exercising the selected skill in historical and real-time conversations associated with the target service level, as well as how the time is distributed within the conversations. Thus, the volume forecast may further predict a total volume of conversations expected for a future period of time, as well as the distribution of conversations within the future period of time. Adjustments may be made to the volume forecast based on known factors, including new advertising campaigns and promotions, new product releases, holiday or other seasonal patterns, etc. Such adjustments may be based on analyses of historical data regarding such factors that have appeared in the past, as well as current projections or reports that may be input or provided to forecast generator 950.

In step 1035, a staffing forecast may be dynamically generated by forecast generator 950 based on the volume forecast. The staffing forecast—illustrated and discussed in further detail with respect to FIG. 16—may be based on information regarding available agents with the selected skill, associated shifts, schedules, and other factors that affect staffing. In addition to the volume forecast associated with the selected skill, the forecast generator 950 may further consider average net handle time, agent load, time in queue, etc., in determining a likelihood of whether the selected target service level will be met under the staffing forecast.

Figure 11:
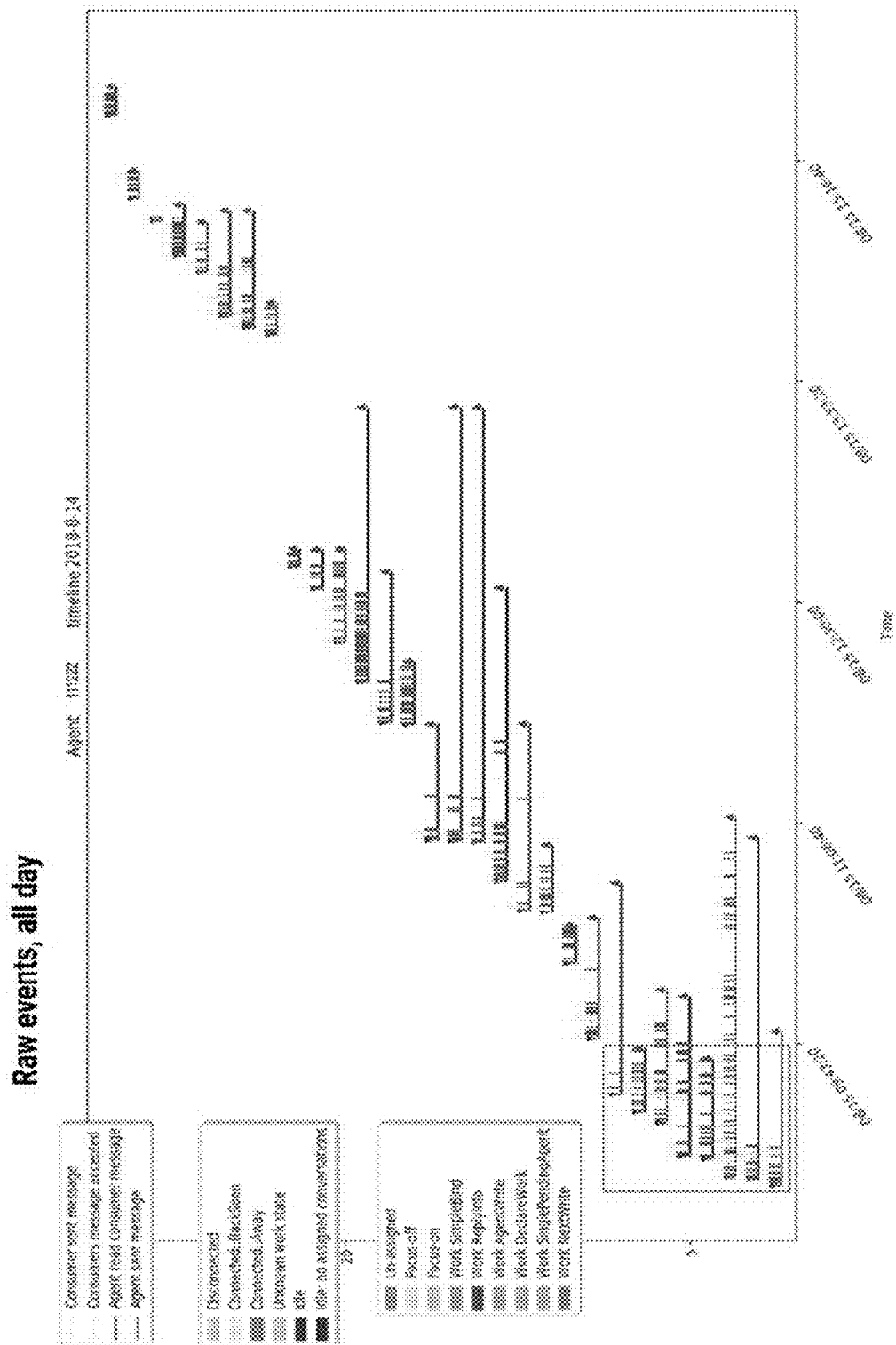
FIG. 11 illustrates an exemplary analysis of conversational events for a single agent during the course of a day.

FIG. 11 illustrates an exemplary analysis of conversational events for a single agent 120 during the course of a day's shift. Such an analysis may be performed by real-time analytics 935 based on the messages routed to the agent 120 and stored in message data store 920. In the graph of FIG. 11, the x-axis represents time throughout the day, while the y-axis represents each of the conversations that were conducted by the agent. As illustrated, the agent conducted multiple conversations, each lasting a certain period of time, and some of which overlapped or were conducted concurrently.

As illustrated in the legend boxes, different conversational events may be identified and characterized. Such events may be categorized based on who is communicating, including consumer sent message, consumer's message accepted, agent read consumer message, and agent sent message. Events may also be categorized by agent status, including disconnected, connected-and-back-soon, connected-but-away, idle, idle-with-no-assigned-conversations, and unknown. Events may also be categorized by intent or issue, including work-simple-bind, work-reply-info, work-agent-write, work-declare-work, work-single-pending-agent, work-next-write, unassigned, focus-off, and focus-on.

Such analysis of agent data may distinguish which of the concurrent conversations is occupying an agent's attention at particular periods of time. Different heuristics may be used to cauterize timeframes in accordance with associated rule sets. For example, focus events may be bound to the same conversation based on proximity of occurrence (e.g., up to 1 minute), which may be configurable or extracted automatically. In addition, NLU may be used to categorize the conversation, as well as identify what particular skill is being used by the agent in addressing the current need. Further, NLU may be used to categorize inter alia question-and-answer periods of time based on identifying that an agent response included an answer to a question posed by a customer or client. NLU may also use agent statements to glean information about how to categorize certain time (e.g., "give me a few minutes to look at what's going on").

Additional heuristics and rules may be applied to identify whether a conversation is still pending a response and from whom the response is pending. As a basic rule, a conversation may be pending-agent if the consumer wrote the last message (at the beginning of un-categorized period). NLU may override this logic in some instances—e.g., if the agent wrote: "I will get back to you shortly"—where the implication is that despite writing the last message, the conversation is still pending-agent. If no conversations are identified as pending-agent during a time period, such time period may be characterized as idle. Such analysis of historical messaging data may continue and remain ongoing as additional conversational data is tracked and collected.

Such analytics may thereafter be used to generate staffing forecasts by way of a dynamic forecasting tool. Such tool may be made available online, whether as a downloadable application or as an online service. Because such forecasts may involve proprietary data, some embodiments may require authentication.

Figure 12:
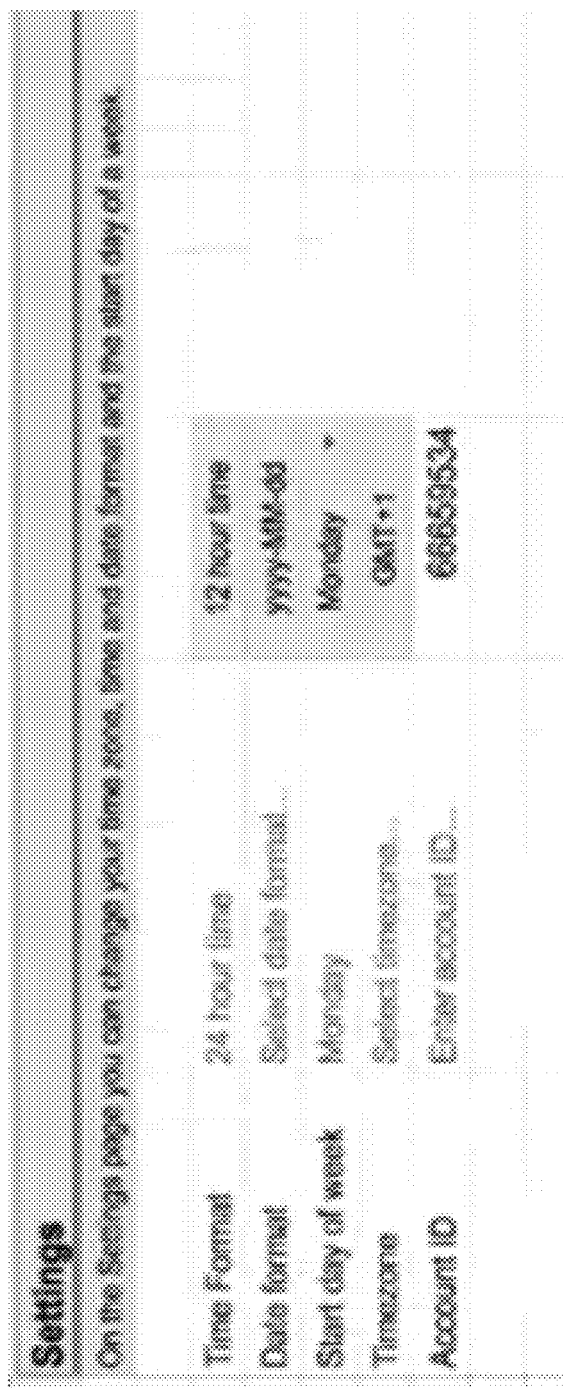
FIG. 12 is a screenshot of an exemplary settings interface.

FIG. 12 is a screenshot of an exemplary settings interface. Such settings interface may allow for certain basic settings to be entered for an entity, including time format, date format, starting weekday, time zone, and account identifier. Once the settings are entered, such settings may persist for future usage of the tool. The settings may be changed, however, and such changes may thereafter persist and affect the way that the data appears on associated pages and documents, e.g. times and dates may appear according to the defined format, presented relative to the set timezone and starting at the set starting weekday.

Figure 13:
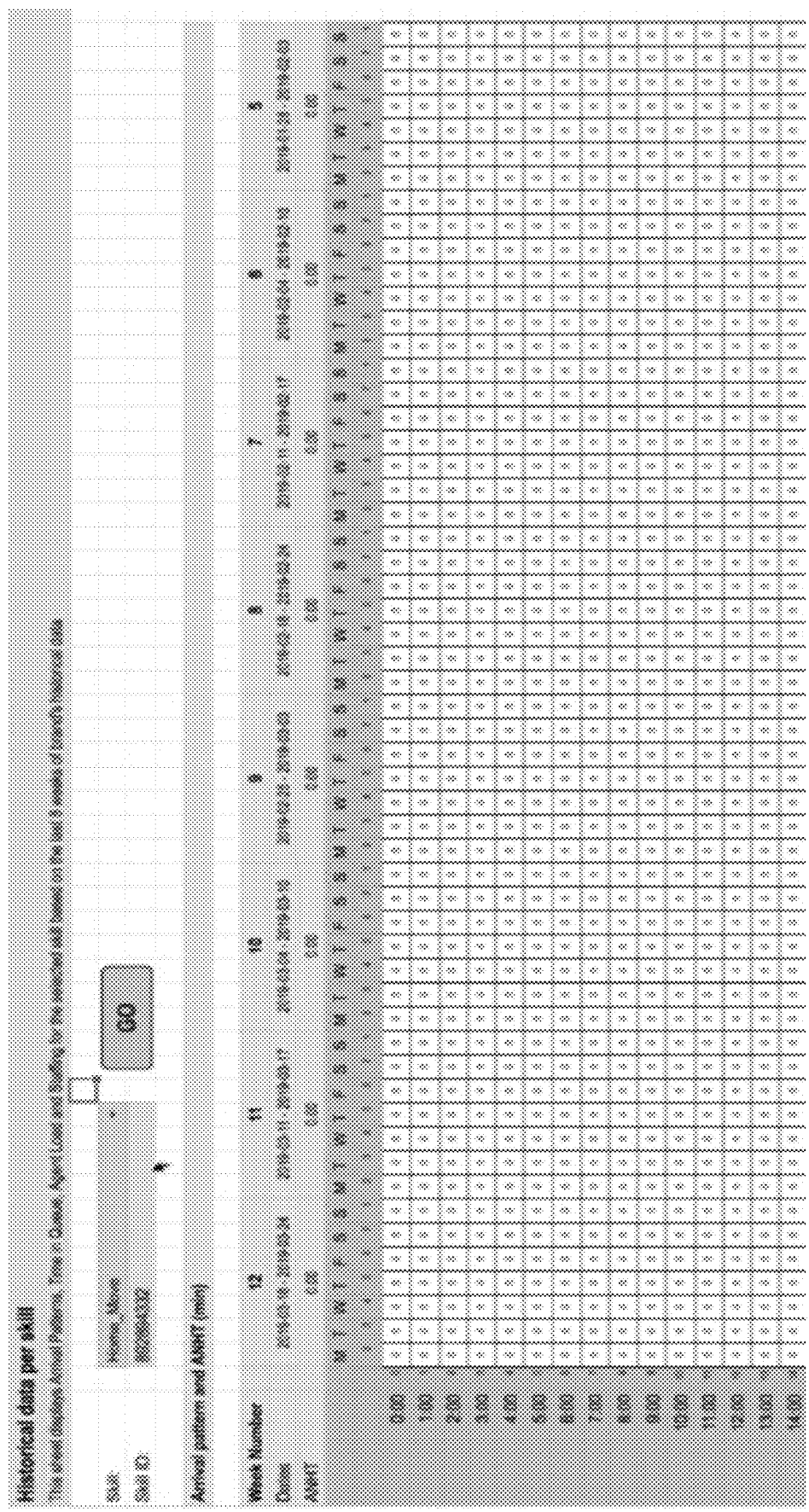
FIG. 13 illustrates an exemplary interface for specifying historical data type.

FIG. 13 illustrates an exemplary interface for specifying historical data type. Such interface allows a client 125 (associated with an entity) to retrieve data related to a selected skill. Such data may be retrieved in order to assess the same prior to forecasting. A client 125 may select a skill, for example, from a drop-down list or menu of available skills. The forecast may therefore be based on a set of historical data that has been filtered to be specific to the selected skill. As such, the client 125 may run different forecast for different skills. In some embodiments, the relevant time period may be configurable (e.g., most recent 8 weeks).

Exemplary historical data regarding a selected skill that may be retrieved may include arrival pattern, agent net handling time (ANHT), time in queue, agent load, and staffing labor. The arrival patterns may be provided on an hourly basis, while ANHT may be provided as minutes per week. Time in queue (in minutes), agent load (between 0 and 1), and staffing labor (in hours) may appear in different displays, and the user may toggle between such displays. In some embodiments, the data (o a selected subset thereof) may also be represented graphically.

The retrieved historical data may further allow for selected sets of data to be included or excluded from being used in generating a forecast. For example, if a power or other type of outage occurred during a particular week, or ANHT was very high due to some technical issues or anomaly, such week's historical data may be excluded in order to avoid skewing the forecast.

Figure 14:
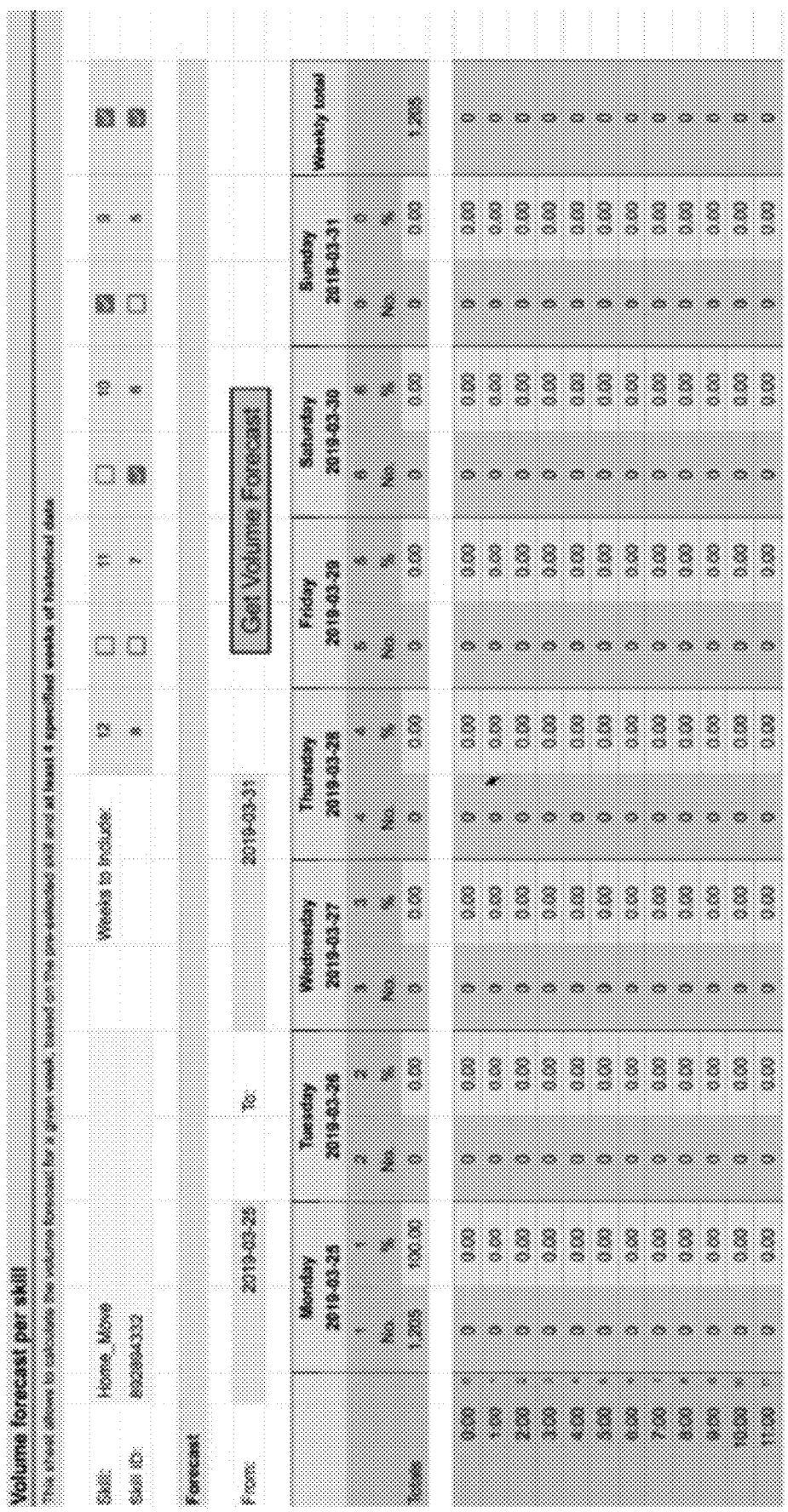
FIG. 14 illustrates an exemplary volume forecast structure for the skill selected in the interface of FIG. 13.

FIG. 14 illustrates an exemplary volume forecast structure for the skill selected in the interface of FIG. 13. A volume forecast may therefore be determined for the entity according to the selected skill and broken down into days, as well as hours. Such volume forecast therefore identifies how much time the selected skill had been utilized in past message conversations, as well as how the time is distributed over the course of the day and week.

The interface of FIG. 14 allows the user to select/unselect the relevant weeks from brand's historical data to be used in the volume forecast and in the staffing forecast. In the "From" and "To" fields, the user may enter the dates for which the forecast is generated. The forecast is performed for a week (e.g., from Monday, 2019-03-25 to Sunday, 2019-03-31).

Once user clicks the "Get Volume Forecast" button, the table below displays the expected volume forecast, broken down by hours of a day for every day of the week. Volume arrivals may be represented as both in absolute numbers and percentages of the weekly/daily traffic. The user can also override the volume forecast, for example, to accommodate for a new marketing campaign, product releases, sales events, holiday events, or other factors expected to increase or decrease messaging traffic. If the user does override the absolute numbers, new percentages may be calculated and adjusted automatically according to their respective absolute numbers.

In some embodiments, the volume forecast may be visually represented in graphical form so as to detect anomalies and deviations from what is expected or predetermined standard. Such graph may be generated based on user selection of a day of the week. Once the user has changed the volume on the days/hours for which it is different from the forecasted one, the user may then click "Accept Forecast" button, which would save the volume forecast together with the numbers, overridden by the user.

Figure 15:
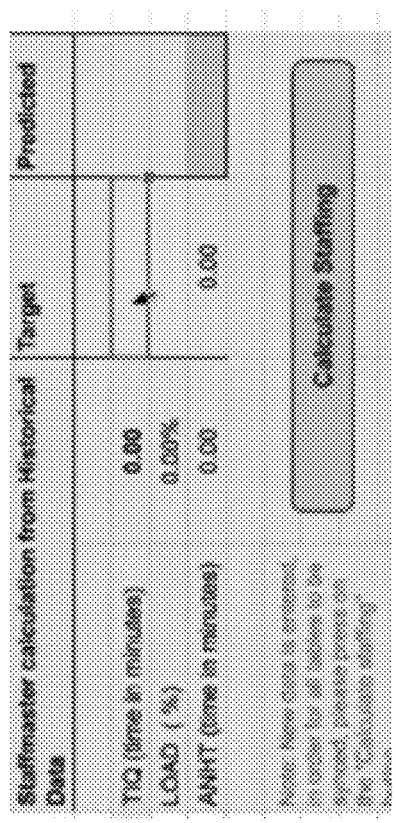
FIG. 15 illustrates an exemplary interface for entry of forecast targets.

FIG. 15 illustrates an exemplary interface for entry of forecast targets. As illustrated, the forecast targets may pertain to time in queue (TIQ), which may be entered as a number of minutes. Other targets may include agent load (percentage) or agent net handling time (in minutes).

The interface of FIG. 15 allows the user to set brand's target service level and discovers how many agents are needed at any particular hour. The converse operation may also be performed, the interface may also take a specified staffing level (e.g., number of labor hours available at a particular hour and a day of the week) to generate a prediction on what the service level would result.

The user may be initially provided with a brand's historical time in queue, agent load, and agent net handling time. Alternatively, the user can provide different numbers to set targets for the service level metrics such as time in queue or service load. After specifying the target service level(s), the user may click on a "Calculate Staffing" button and the table to the right side may be populated with the staffing forecast for all the hours of the preselected week.

Figure 16:
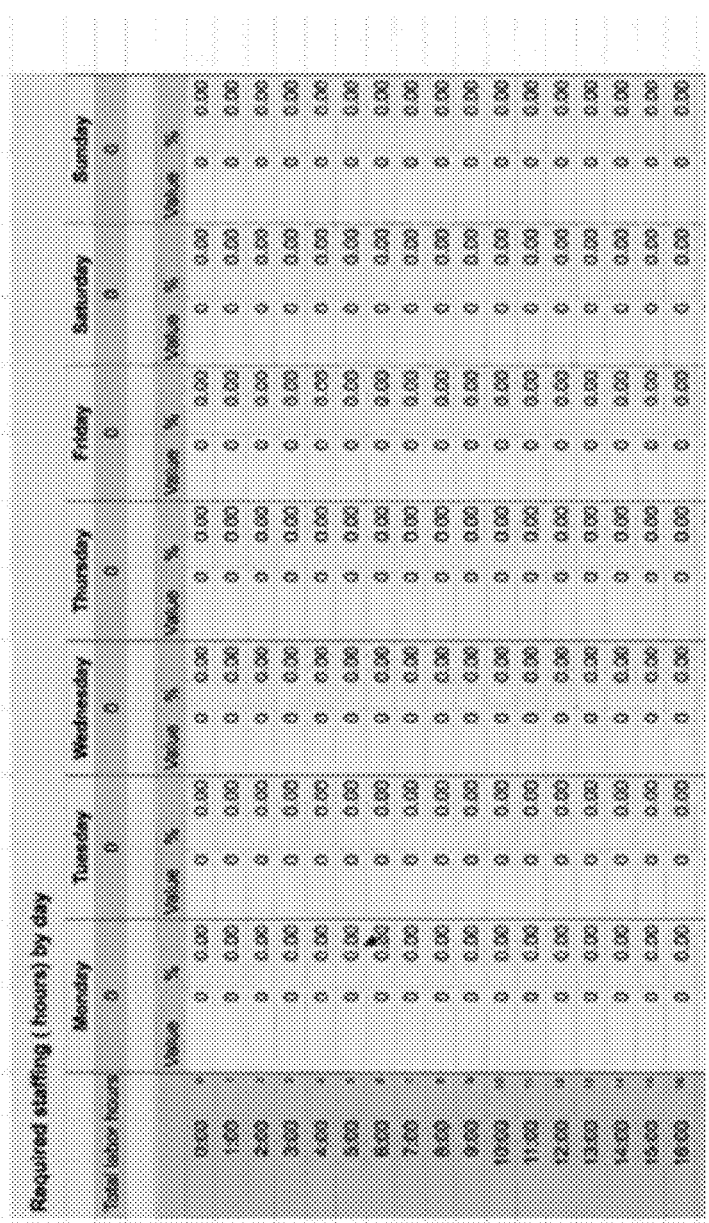
FIG. 16 illustrates an exemplary staffing forecast structure for the skill selected in the interface of FIG. 13.

FIG. 16 illustrates an exemplary staffing forecast structure for the skill selected in the interface of FIG. 13. Such staffing forecast may identify the amount of required staffing for each hour of each day. The staffing forecast can then be exported to another application that handles staff scheduling. In some embodiments, the staffing forecast may apply shrinkage adjustments to the forecast numbers and to generate a shift schedule for a contact center. The resulting staffing schedule can then be re-evaluated to obtain a service quality prediction.

Given the volume (number of conversations expected for that skill), average net handle time, agent load and time in queue, the dynamic forecast may generate a staffing forecast in terms of required labor hours before shrinkage adjustment. In another embodiment the dynamic forecast may use the volume (number of conversations expected for that skill), currently planned staffing and average net handle time to predict the service level, time in queue, and agent load.

Staffing labor hours may be represented as both absolute numbers and percentages of the total daily staffing hours. The user can override the staffing forecast (all the green cells can be overridden). This is done, for example, in cases where there are certain known constraints on the amount of available agent hours. Where the user overrides the absolute numbers, the percentages may be calculated and adjusted automatically, according to their respective absolute numbers.

In some embodiments, the staffing forecast may be visually presented in graphical form so as to illustrate the daily hours distribution. The user can select a day of the week to display on the graph, as well as change the planned staffing levels (labor hours) and get a prediction on a service level that may result. After changing some of the values in the staffing table, the user can click the "Calculate Service Level" button to see the effect on the service level.

The table may provide the predicted service level numbers, is also accompanied by graphs illustrating service level metric (e.g., average time in queue and average agent load). The user can select a day of the week to display on the graph. In some embodiments, the data in the service level table below may not be editable, so if the user wishes to change the service level metrics, the user can do so by adjusting the weekly target metrics for time in queue and agent load. Once the user is done with the forecast, the user may click on the "Copy Forecast to New Sheet" button to create a copy of the forecast as a separate sheet.

To create a forecast for another skill the user can repeat the same process, selecting a different skill on the "Historical Results" tab. When the staffing forecast is performed for all the desired skills, the user can copy-and-paste the staffing numbers to any of the systems used by the brand for staff scheduling.

In some embodiments, additional features of the dynamic forecast may include "what-if" analyses, which allow for simulations to be run with projected conditions and levels of need to estimate the impact of changes on traffic, staff, occupancy, and service level. This is useful for a brand planning to launch a new messaging program (or feature thereof) or facing new conditions for which there is no historical data. Such simulations may also be useful in cases where a brand is overstaffed, where historical data alone may not provide an accurate projection on the required staffing levels.

For existing messaging programs, the dynamic forecast may predict the required agent staffing numbers by learning a rand's historical messaging data and growth predictions. Such predictions may apply to labor time per skill. For example, when brands operate in a mode where agents have multiple different skills, causing their hours to be split between the different skills. Currently, there is no staff forecasting solution with skill granularity. The present dynamic forecast tool, however, has the ability to generate forecasts for specific skills. Using a novel algorithm for allocating the agent's time between conversations, an agent's total labor time may be identified as corresponding to specific skills.

Using the agent load metric, the present dynamic forecasting tool may also take into account the brand's occupancy targets (how busy agents is expected to be in a given period) by recommending staffing levels that are consistent both with desired service level and target occupancy.

The present dynamic forecasting tool may automatically provide the brand with the average traffic from a selected past history period, which can serve as a basis for growth scenarios. For example, to adapt the forecast to special events, such as media campaigns, weather forecasts, etc. Flexible staffing inputs with defaults may also be provided, as the present dynamic forecast tool may use historical data to estimate the brand's unique operational parameters indicative of staffing needs, while allows the brand to override these estimates with brand-specified inputs.

In some cases, a heatmap of past service level (e.g., time in queue) may be provided. In addition, the present dynamic forecasting tool may also detect at a skill level any patterns that may emerge in service levels, as well as make recommendations regarding staffing changes likely to better align with target service levels.

Agent net handle time is analogous to equivalent for the average handle time (AHT), traditionally used in telephony. Agent net handle time, however, allows for periods within the total labor time of multi-skilled agents to be attributed to each of their different skills, leading to a novel, per-skill metric used for staffing calculations for messaging.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
presenting a plurality of skills and a plurality of target service levels for skills via a graphical user interface;
receiving a selection via the graphical user interface, wherein the selection is of a skill and a desired target service level for the skill corresponding to a desired customer satisfaction level;
filtering, by a real-time analytics module, historical messaging data based on the selected skill and the selected target service level for the skill to obtain filtered results, wherein the filtered results include a set of the historical data associated with the selected skill and the selected target service level for the skill;
analyzing, using the filtered results, a current messaging session in real-time as messages of the current messaging session are being routed, wherein the current messaging session is analyzed according to one or more skills being exercised during different time periods within the current messaging session;
using the analysis to attribute a particular time period to the selected skill in real-time, the particular time period corresponding to a time period during which the selected skill is being exercised within the current messaging session;

associating the particular time period during which the selected skill is being exercised with a particular customer satisfaction level;

generating a prediction by applying a trained learning model to the filtered results, the particular time period attributed to the selected skill, and the associated particular customer satisfaction level wherein the prediction corresponds to a projected staffing level for servicing messaging conversations associated with the selected skill and the target service level for the skill, and wherein the learning model is refined according to the selected skill associated with the particular time period; and dynamically adjusting a staffing forecast in real-time based on the prediction, wherein the staffing forecast is used to determine staffing related to the selected skill needed to achieve the target service level for the skill.

2. The computer-implemented method of claim 1, further comprising:

generating the staffing forecast based on a volume forecast, the volume forecast based on the filtered results.

3. The computer-implemented method of claim 1, further comprising:

analyzing the historical messaging data to identify one or more events within one or more messaging interactions.

4. The computer-implemented method of claim 1, further comprising:

characterizing one or more time periods within a total amount of time worked by an agent based on one or more identified events, wherein attributing the particular time period of the total amount of time associated with the current messaging session to the selected skill is further based on the characterization.

5. The computer-implemented method of claim 1, further comprising:

generating a graphical representation of the staffing forecast.

6. The computer-implemented method of claim 1, further comprising:

detecting that the staffing forecast deviates from a predetermined standard.

7. The computer-implemented method of claim 1, further comprising:

generating a recommendation to align the staffing forecast with a predetermined standard.

8. The computer-implemented method of claim 1, wherein when the target service level is identified according to one or more service level metrics, the prediction further includes the one or more service metrics corresponding to the target service level.

9. A system comprising:

memory that stores historical messaging data;

a graphical user interface that presents a plurality of skills and a plurality of target service levels; and a processor that executes instructions stored in the memory, wherein execution of the instructions by the processor:

receives a selection via the graphical user interface, wherein the selection is of a skill and a desired target service level for the skill corresponding to a desired customer satisfaction level;

filters the historical messaging data based on the selected skill and the selected target service level for the skill to obtain filtered results, wherein the filtered results include a set of the historical data associated with the selected skill and the selected target service level for the skill;

analyzes, using the filtered results, a current messaging session in real-time as messages of the current messaging session are being routed, wherein the current messaging session is analyzed according to one or more skills being exercised during different time periods within the current messaging session;

uses the analysis to attribute a particular time period to the selected skill in real-time, the particular time period corresponding to a time period during which the selected skill is being exercised within the current messaging session;

associates the particular time period during which the selected skill is being exercised with a particular customer satisfaction level;

generates a prediction by applying a trained learning model to the filtered results, the particular time period attributed to the selected skill, and the associated particular customer satisfaction level, wherein the prediction corresponds to a projected staffing level for servicing messaging conversations associated with the selected skill and the target service level for the skill, and wherein the learning model is refined according to the selected skill associated with the particular time period; and dynamically adjusts a staffing forecast in real-time based on the prediction, wherein the staffing forecast is used to determine staffing related to the skill needed to achieve the target service level for the skill.

10. The system of claim 9, wherein the processor executes further instructions to generate the staffing forecast based on a volume forecast, the volume forecast based on the filtered results.

11. The system of claim 9, wherein the processor executes further instructions to:

analyze the historical messaging data to identify one or more events within one or more messaging interactions.

12. The system of claim 9, wherein the processor executes further instructions to:

characterize one or more time periods within a total amount of time worked by an agent based on one or more identified events, wherein the processor attributes the particular time period of the total amount of time associated with the current messaging session to the selected skill further based on the characterization.

13. The system of claim 9, wherein the processor executes further instructions to:

generate a graphical representation of the staffing forecast.

14. The system of claim 9, wherein the processor executes further instructions to:

detect that the staffing forecast deviates from a predetermined standard.

15. The system of claim 9, wherein the processor executes further instructions to:

generate a recommendation to align the staffing forecast with a predetermined standard.

16. The system of claim 9, wherein when the target service level is identified according to one or more service metrics, the prediction further includes the one or more service metrics corresponding to the target service level.

17. A non-transitory, computer-readable storage medium, having embodied thereon a program executable by a processor to perform a method comprising:
- presenting a plurality of skills and a plurality of target service levels for skills via a graphical user interface;
- receiving a selection via the graphical user interface, wherein the selection is of a skill and a desired target service level for the skill corresponding to a desired customer satisfaction level;
- filtering historical messaging data based on the selected skill and the selected target service level for the skill to obtain filtered results, wherein the filtered results include a set of the historical data associated with the selected skill and the selected target service level for the skill;
- analyzing, using the filtered results, a current messaging session in real-time as messages of the current messaging session are being routed, wherein the current messaging session is analyzed according to one or more skills being exercised during different time periods within the current messaging session;
- using the analysis to attribute a particular time period to the selected skill in real-time, the particular time period corresponding to a time period during which the selected skill is being exercised within the current messaging session;
- associating the particular time period during which the selected skill is being exercised with a particular customer satisfaction level;
- generating a prediction by applying a trained learning model to the filtered results, the particular time period attributed to the selected skill, and the associated particular customer satisfaction level, wherein the prediction corresponds to a projected staffing level for servicing messaging conversations associated with the selected skill and the target service level for the skill, and wherein the learning model is refined according to the selected skill associated with the particular time period; and
- dynamically adjusting a staffing forecast in real-time based on the prediction, wherein the staffing forecast is used to determine staffing related to the selected skill needed to achieve the target service level for the skill.

18. The non-transitory, computer-readable storage medium of claim 17, further comprising instructions executable to:
- generate the staffing forecast based on a volume forecast, the volume forecast based on the filtered results.

19. The non-transitory, computer-readable storage medium of claim 17, further comprising instructions executable to:
- analyze the historical messaging data to identify one or more events within one or more messaging interactions.

20. The non-transitory, computer-readable storage medium of claim 17, further comprising instructions executable to:
- characterize one or more time periods within a total amount of time worked by an agent based on one or more identified events, wherein attributing the particular time period of the total amount of time associated with the current messaging session to the selected skill is further based on the characterization.

21. The non-transitory, computer-readable storage medium of claim 17, further comprising instructions executable to:
- generate a graphical representation of the staffing forecast.

22. The non-transitory, computer-readable storage medium of claim 17, further comprising instructions executable to:
- detect that the staffing forecast deviates from a predetermined standard.

23. The non-transitory, computer-readable storage medium of claim 17, further comprising instructions executable to:
- generate a recommendation to align the staffing forecast with a predetermined standard.

24. The non-transitory, computer-readable storage medium of claim 17, wherein when the target service level is identified according to one or more service level metrics, the prediction further includes the one or more service metrics corresponding to the target service level.

* * * * *